US008788411B2

(12) United States Patent
Nuzzi et al.

(10) Patent No.: US 8,788,411 B2
(45) Date of Patent: Jul. 22, 2014

(54) RFID PAYMENT SYSTEM

(75) Inventors: Frank Anthony Nuzzi, Pflugerville, TX (US); Darrin Brook Giesy, Austin, TX (US)

(73) Assignee: eBay Inc., San Jose, CA (US)

( * ) Notice: Subject to any disclaimer, the term of this patent is extended or adjusted under 35 U.S.C. 154(b) by 505 days.

(21) Appl. No.: 13/044,096

(22) Filed: Mar. 9, 2011

(65) Prior Publication Data

US 2012/0150727 A1    Jun. 14, 2012

Related U.S. Application Data

(63) Continuation-in-part of application No. 12/966,212, filed on Dec. 13, 2010.

(51) Int. Cl.
G06Q 40/00 (2012.01)
(52) U.S. Cl.
USPC .......................................................... 705/39
(58) Field of Classification Search
USPC .................................................... 705/35–45
See application file for complete search history.

(56) References Cited

U.S. PATENT DOCUMENTS

| 7,213,750 B1 | 5/2007 | Barnes et al. |
| 2003/0212620 A1 | 11/2003 | Blagg |
| 2005/0165695 A1* | 7/2005 | Berardi et al. ................... 705/64 |
| 2007/0057038 A1* | 3/2007 | Gannon ......................... 235/380 |
| 2007/0296551 A1 | 12/2007 | Beenau et al. |
| 2009/0307139 A1 | 12/2009 | Mardikar et al. |
| 2010/0063924 A1 | 3/2010 | Hougland et al. |
| 2010/0223184 A1 | 9/2010 | Perlman |

OTHER PUBLICATIONS

PCT International Search Report, Application No. PCT/US2012/27411 mailed Jun. 6, 2012.

* cited by examiner

*Primary Examiner* — Robert Niquette
*Assistant Examiner* — Chia Yi Liu
(74) *Attorney, Agent, or Firm* — Haynes and Boone, LLP

(57) ABSTRACT

A method for making a payment using a RFID system includes associating a first RFID identifier with a payer account in a database. A purchase type and an associated spending gate definition are received for the first RFID identifier over the network. The spending gate definition is associated with at least one of a plurality of funding sources of the payer account. The purchase type and associated spending gate definition are associated with the first RFID identifier in the database. A payment request is received for a purchase using the first RFID identifier over the network. It is determined that that the payment request includes the purchase type in the database. A payment is made using the at least one funding source of the payer account according to the spending gate definition associated with the purchase type.

16 Claims, 20 Drawing Sheets

RFID PAYMENT SYSTEM

CROSS REFERENCE TO RELATED APPLICATIONS

The present application is a continuation-in-part of and incorporates by reference U.S. patent application Ser. No. 12/966,212, filed on Dec. 13, 2010.

BACKGROUND

1. Field of the Invention

The present invention generally relates to online and/or mobile payments and more particularly to a Radio Frequency Identification (RFID) payment system.

2. Related Art

More and more consumers are purchasing items and services over electronic networks such as, for example, the Internet. Consumers routinely purchase products and services from payees and individuals alike. The transactions may take place directly between a conventional or on-line payee or retailer and the consumer, and payment is typically made by providing credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line purchases are growing very quickly.

One conventional way of making mobile payments is for payees to program an account identification number for an account on an RFID tag and provide an RFID device including that RFID tag to the account holder. The payer may then use that RFID device to transmit the account identification number to a payee so that the account may be used to make a payment. For example, RFID tags are used in toll road systems by programming the RFID tag with an account identification number for an account of a payer and then positioning an RFID device including that RFID tag in a car of the payer. When that car passes through a toll that includes a scanning antenna, the RFID tag will detect a signal from the scanning antenna and, in response, transmit the account identification number to a payee device so that the account of the payer may be charged the toll. However, such conventional systems only allow one account or funding source to be associated with the RFID tag, which may require the payer to carry around multiple physical RFID devices, each programmed and provided by particular payees, if the payer would like to make mobile payments to those payees.

Thus, there is a need for an improved RFID payment system.

SUMMARY

According to one embodiment, a method for making a payment using Radio Frequency Identification (RFID) includes associating an RFID identifier with a payer account in a database. The RFID identifier is also associated with a purchase type and an associated spending gate definition in the database. The spending gate definition is associated with at least one of a plurality of funding sources of the payer account. When a payment request is received using the RFID identifier, if the purchase type provided with the payment request is in the database as an acceptable purchase type, a payment is made using the at least one funding source of the payer account according to the spending gate definition associated with the purchase type.

In an embodiment, a plurality of payer information that is not related to the payer account is associated with the RFID identifier. The RFID identifier may be received from the payee, and the plurality of payer information may then be sent to the payee.

As a result, a payer may define a plurality of funding sources to be used, based on the type of purchase being made, when making payments using an RFID tag. The RFID tag may also be used to transmit payer information to a payee for use by the payee to provide goods and/or services to the payer.

These and other features and advantages of the present disclosure will be more readily apparent from the detailed description of the embodiments set forth below taken in conjunction with the accompanying figures.

Figure 1A:
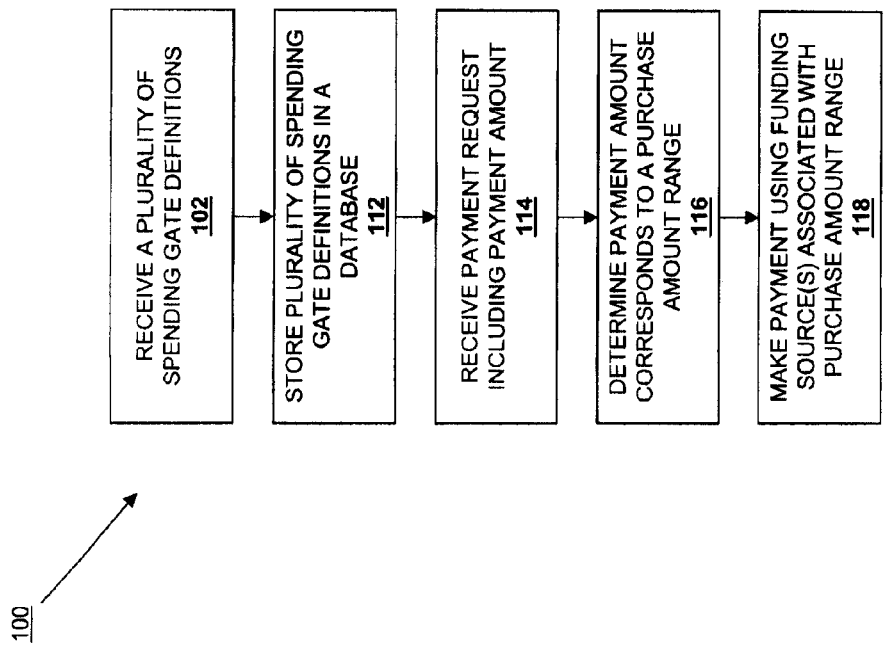
FIG. 1a is a flow chart illustrating an embodiment of a method for making a payment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for making payments for a purchase using a Radio Frequency Identification (RFID) system or RFID tag associated with a payer account according to a plurality of spending gate definitions associated with that payer account. Each of the plurality of spending gate definitions associate at least one of a plurality of funding sources of the payer account with a purchase amount range and optionally a purchase type such that purchase amount ranges and/or purchase types are used to define, which, when, and how funding sources are to be used to make a payment for a purchase made using the RFID tag. This allows a payer to define different funding sources for different purchases and precisely control how purchases are paid for.

The discussion below with reference to FIGS. 1a, 1b, 1c, 1d, 1e, 1f, 1g, 1h, 1i, and 1j relates to the creation and use of spending gate definitions for purchase amount ranges. That discussion is followed by a discussion of the use of RFID devices that use such spending gate definitions.

Figure 1B:
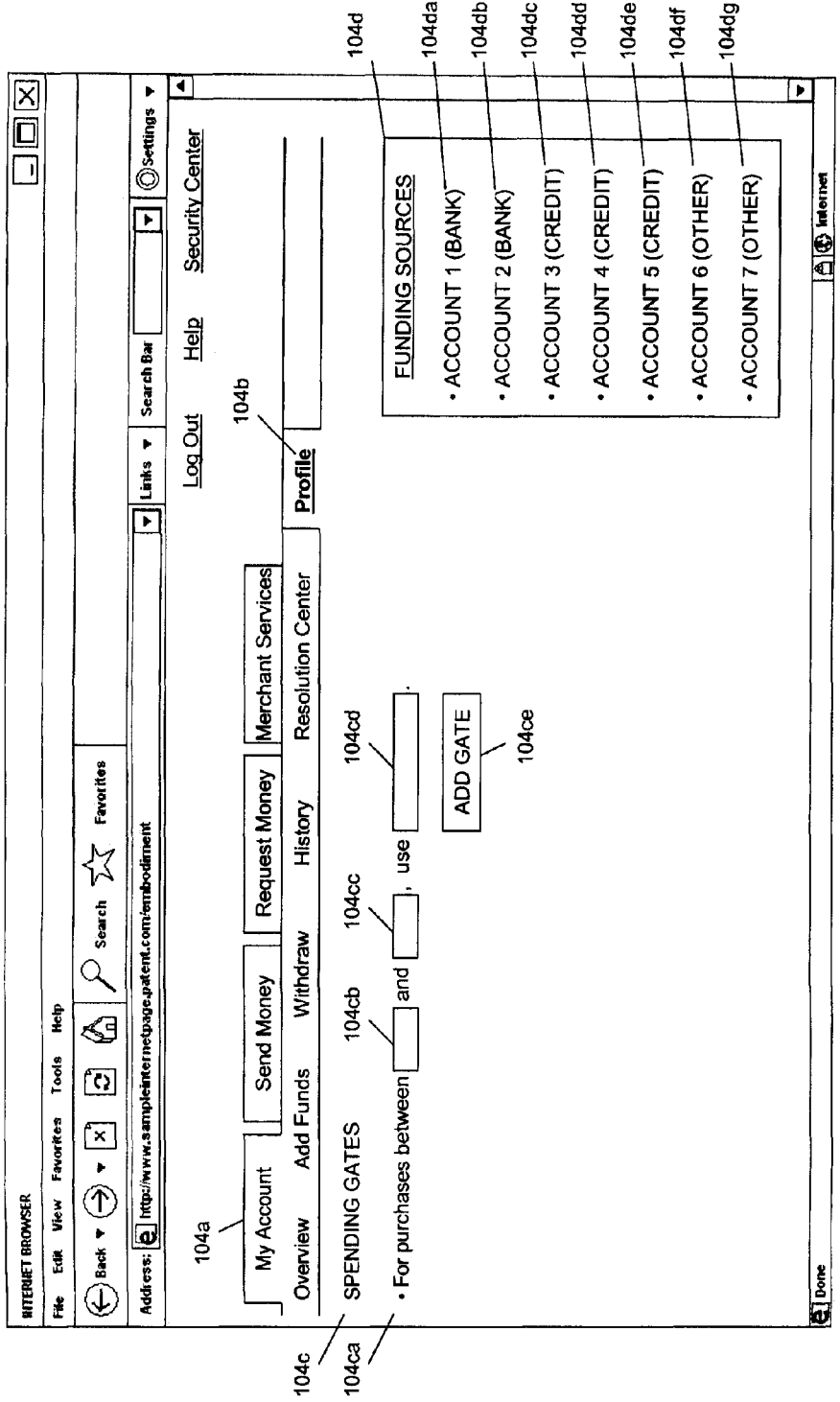
FIG. 1b is a screenshot view illustrating an embodiment of a payer account website with an editable spending gate definition.

Referring now to FIGS. 1a, 1b, 1c, and 1d, a method 100 for making a payment is illustrated. The method 100 begins at block 102 where a payment service provider receives a plurality of spending gate definitions for a payer account. FIG. 1b illustrates an embodiment of a screenshot of a payer account website 104 that allows a payer to provide a plurality of spending definitions to a payment service provider. In an embodiment, the payer account website 104 may be provided by the payment service provider and accessed by the payer using networked computer systems, described in further detail below. One of skill in the art will recognize that the payer may provide a variety of information (e.g., a login ID, a password, etc.) to gain access to the payer account website 104 having one or more web pages as described below. The payer account website 104 includes a My Account tab 104a having a Profile section 104b. The Profile section 104b includes a Spending Gates definition section 104c and a Funding Sources section 104d. The Spending Gates definition section 104c includes an editable definition 104ca having a plurality of input fields 104cb, 104cc, and 104cd, and an Add Gate button 104ce. The Funding Sources section 104d includes a plurality of funding sources 104da, 104db, 104dc, 104dd, 104de, 104df, and 104dg. In an embodiment, the plurality of funding sources 104da, 104db, 104dc, 104dd, 104de, 104df, and 104dg include banking accounts, credit accounts, and other accounts of the payer to which the payment service provider has access in order to make payments.

Figure 1C:
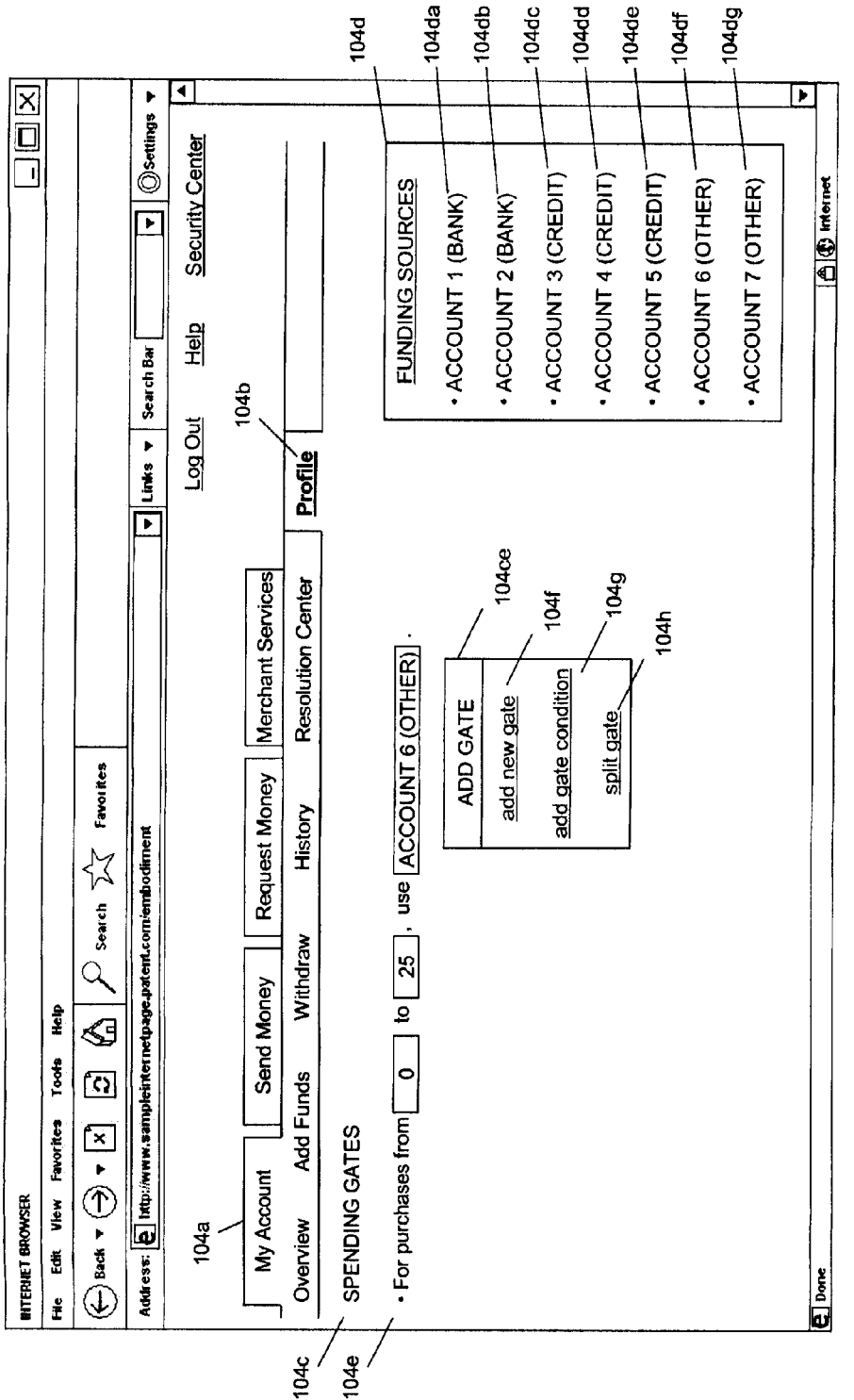
FIG. 1c is a screenshot view illustrating an embodiment of a payer account website with a spending gate definition.

The payer may use the payer account website 104 by filling in the plurality of input fields 104cb and 104cc of the editable definition 104ca with desired purchase amounts to create a purchase amount range (while the illustrated embodiment uses dollars for the purchase amounts, euros, yuan, and/or a variety of other currencies known in the art may be used without departing from the scope of the present disclosure) and filling in the input field 104cd with a funding source (e.g., one of the funding sources 104da, 104db, 104dc, 104dd, 104de, 104df, and 104dg), as illustrated in FIG. 1c. In the embodiment illustrated in FIG. 1c, the payer has used the editable definition 104ca of FIG. 1b to create a spending gate definition 104e that instructs the payment service provider to use funding source 104df (ACCOUNT 6 (OTHER)) for any purchase up to $25.00. For example, the payer may desire that small purchases (e.g., a purchase amount range between $0 and $25.00) be paid for using credits from an account provided by the payment service provider (i.e., ACCOUNT 6 (OTHER)), and the spending gate definition 104e provides that instruction to the payment service provider. The payer may then select the Add Gate button 104ce in order to be presented with an Add New Gate link 104f, an Add Gate Condition link 104g, and a Split Gate link 104h, as illustrated in FIG. 1c.

The payer may select the Add New Gate link 104f in the Add Gate button 104ce of FIG. 1b to be presented with an editable definition that is substantially similar to the editable definition 104ca of FIG. 1b and the payer may then fill in the plurality of input fields (substantially similar to the input fields 104cb and 104cc of FIG. 1b) associated with each editable definition with desired purchase amounts to create purchase amount ranges and fill in the input fields (substantially similar to the input field 104cd of FIG. 1b) with funding sources to create one or more spending gate definitions. One of skill in the art will recognize that the payer may use the Add New Gate link 104f to create as many spending gate definitions as the payer desires.

Figure 1D:
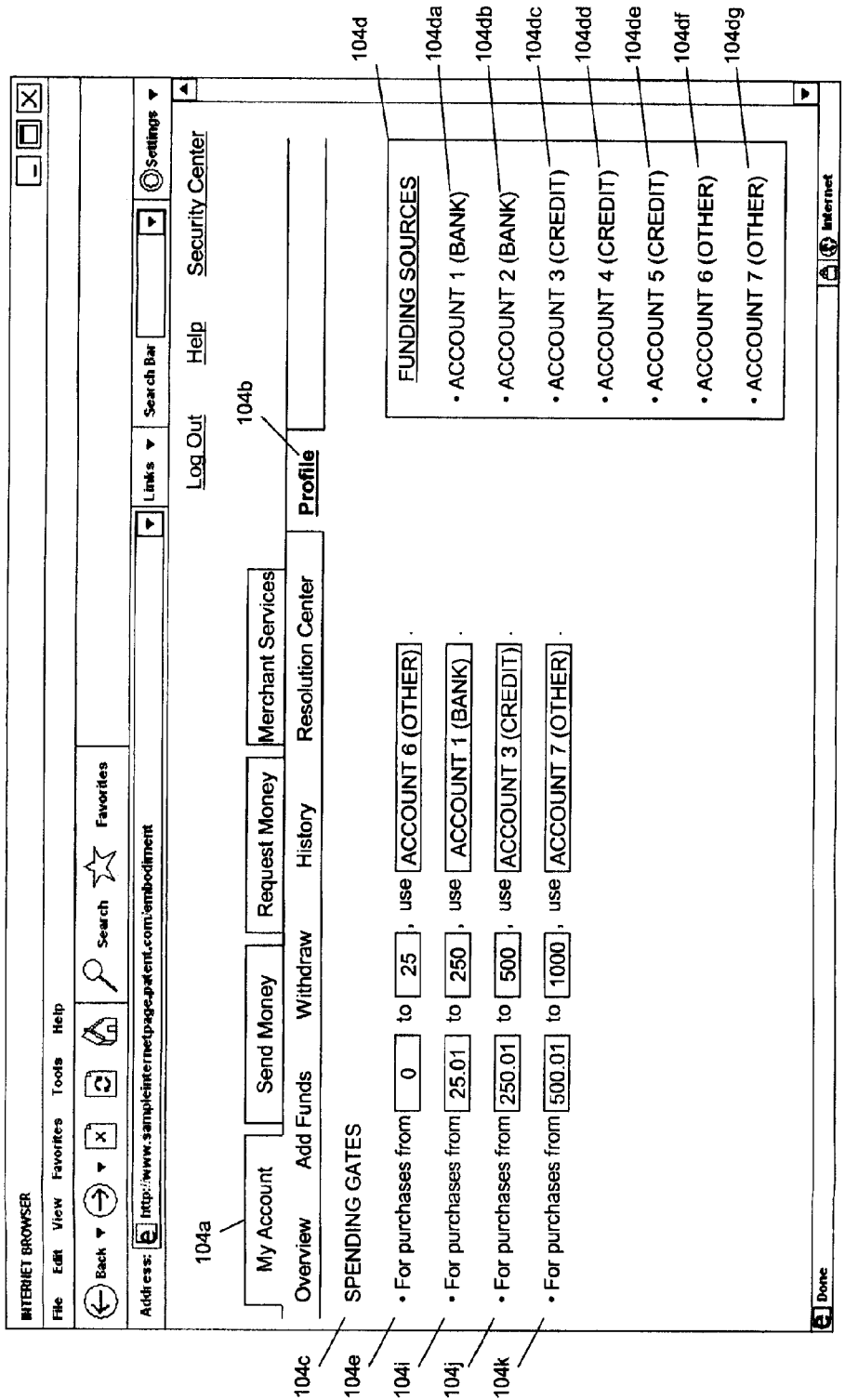
FIG. 1d is a screenshot view illustrating an embodiment of a payer account website with a plurality of spending gate definitions.

In the embodiment illustrated in FIG. 1d, the payer has used an editable definition to create a spending gate definition 104i that instructs the payment service provider to use funding source 104da (ACCOUNT 1 (BANK)) for any purchase between $25.01 and $250.00. For example, the payer may desire that smaller intermediate purchases (e.g., a purchase amount range between $25.01 and $250.00) be paid for using a bank account (i.e., ACCOUNT 1 (BANK)), and the spending gate definition 104i provides that instruction to the payment service provider. The payer has also used an editable definition to create a spending gate definition 104j that instructs the payment service provider to use funding source 104dc (ACCOUNT 3 (CREDIT)) for any purchase between $250.01 and $500.00. For example, the payer may desire that larger intermediate purchases (e.g., a purchase amount range between $250.01 and $500.00) be paid for using a credit account (i.e., ACCOUNT 3 (CREDIT)), and the spending gate definition 104j provides that instruction to the payment service provider. The payer has also used an editable definition to create a spending gate definition 104k that instructs the payment service provider to use funding source 104dg (ACCOUNT 7 (OTHER)) for any purchase between $500.01 and $1000.00. For example, the payer may desire that large purchases (between $500.01 and $1000.00) be paid for using an account provided by the payment service provider that bills the payer for the purchase at a later time (e.g., a BillMeLater account known in the art and provided by PayPal, Inc. of San Jose, Calif.) (i.e., ACCOUNT 7 (OTHER)), and the spending gate definition 104k provides that instruction to the payment service provider.

While a plurality of spending gate definitions 104e, 104i, 104j, and 104k have been illustrated and discussed, one of skill in the art will recognize that a plurality of other spending gate definitions may be created using the techniques described above without departing from the scope of the present disclosure (e.g., the spending maximum for a funding source may be unbounded for the largest purchases (e.g., purchases from "$500.01 and up" or "$500.01 to the limits of the funding source"). Furthermore, a variety of other spending gate definitions may be combined with the spending gate definitions 104e, 104i, 104j, and 104k, a few embodiments of which are discussed in further detail below.

Figure 1E:
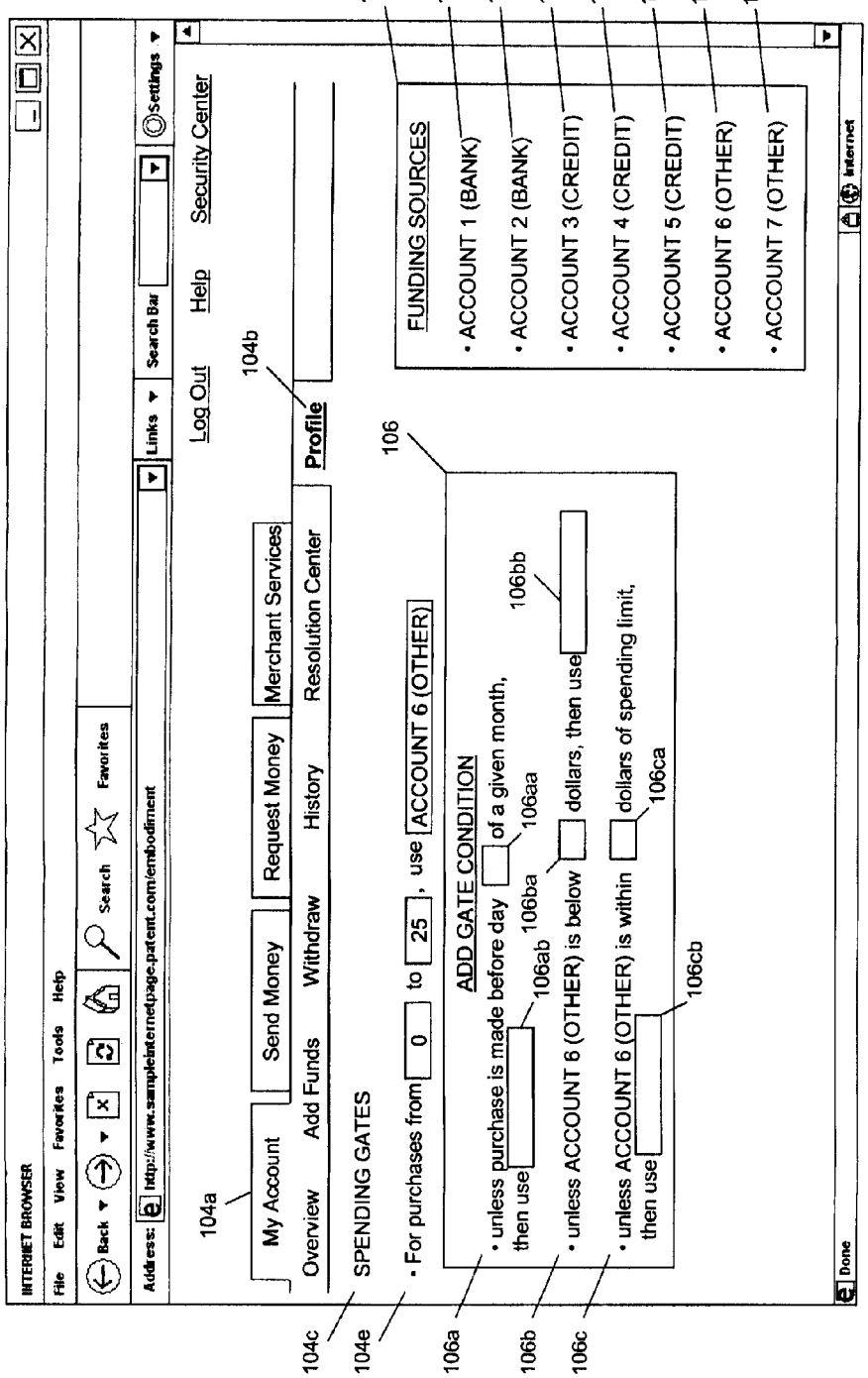
FIG. 1e is a screenshot view illustrating an embodiment of a payer account website with a plurality of editable conditions for a spending gate definition.
Figure 1F:
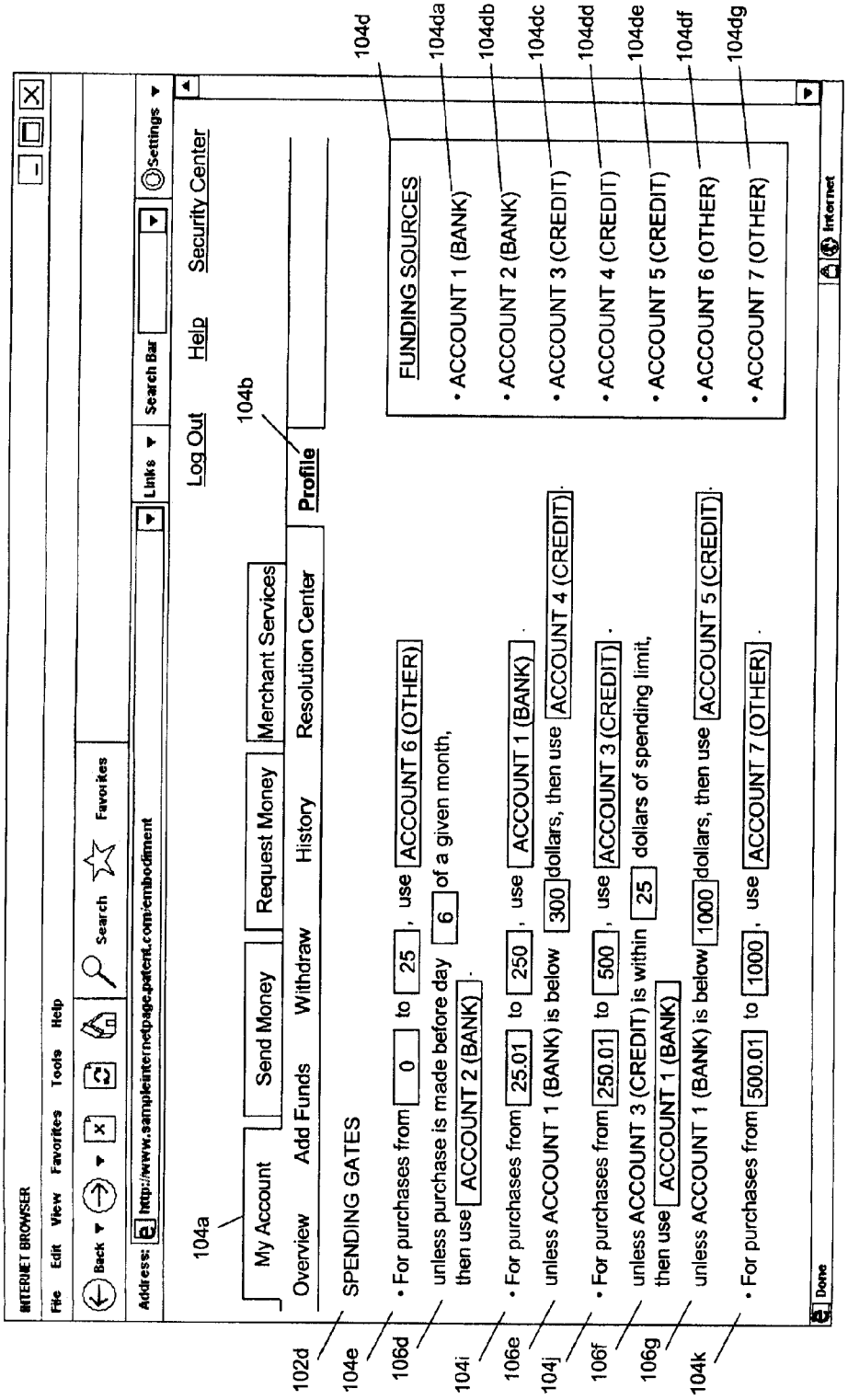
FIG. 1f is a screenshot view illustrating an embodiment of a payer account website with a plurality of spending gate definitions including spending gate conditions.

Referring now to FIGS. 1e and 1f, the payer may select the Add Gate Condition link 104g in the Add Gate button 104ce of FIG. 1b subsequent to creating any spending gate definition (e.g., the spending gate definitions 104e, 104i, 104j, and 104k.) Selection of the Add Gate Condition link 104g presents the payer with an Add Gate Condition box 106 that includes a plurality of editable conditions 106a, 106b and 106c, as illustrated in FIG. 1e. The editable condition 106a includes a plurality of input fields 106aa and 106ab, the editable condition 106b includes a plurality of input fields 106ba and 106bb, and the editable condition 106c includes a plurality of input fields 106ca and 106cb.

The payer may use the payer account website 104 by selecting one of the editable conditions 106a, 106b, or 106c and filling in the plurality of input fields associated with that editable condition with the appropriate information (e.g., a day of the month for input field 106aa associated with editable condition 106a, a dollar amount for inputs fields 106ba and 106ca associated with editable conditions 106b and 106c, and funding source(s) for input fields 106ab, 106bb, and 106cb.)

For example, in the embodiment illustrated in FIG. 1f, the payer has used the editable condition 106a of FIG. 1e to add a spending gate condition 106d to the spending gate definition 104e that instructs the payment service provider to use funding source 104db (ACCOUNT 2 (BANK)) for any purchase up to $25.00 if the purchase is made before the $6^{th}$ day of a given month, and at other times to use the funding source 104df (ACCOUNT 6 (OTHER)). For example, the payer may desire that small purchases (e.g., a purchase amount range between $0 and $25.00) be paid for using credits from an account provided by the payment service provider (i.e., ACCOUNT 6 (OTHER)) unless it is before the $6^{th}$ day of a given month and, if it is, to use the funding source 104db (ACCOUNT 2 (BANK)) due to, for example, that funding source having a deposit that is regularly deposited at the beginning of the month, and the spending gate condition 106d modifies the spending gate definition 104e to provide that instruction to the payment service provider.

The payer has also used the editable condition 106b of FIG. 1e to add a spending gate condition 106e to the spending gate definition 104i that instructs the payment service provider to use funding source 104dd (ACCOUNT 4 (CREDIT)) for any between $25.01 and $250.00 if funding source 104da (ACCOUNT 1 (BANK)) is below $300. For example, the payer may desire that smaller intermediate purchases (e.g., a purchase amount range between $25.01 and $250.00) be paid for using a bank account (i.e., ACCOUNT 1 (BANK)) unless the balance in that bank account is below $300 and, if it is, to use the funding source 104dd (ACCOUNT 4 (CREDIT)) in order to ensure that the balance on the bank account does not get too low, and the spending gate condition 106e modifies the spending gate definition 104i to provide that instruction to the payment service provider.

The payer has also used editable conditions 106c and 106b of FIG. 1e to create a spending gate definition 104j that instructs the payment service provider to use funding source 104da (ACCOUNT 1 (BANK)) for any purchase between $250.01 and $500.00 if the funding source 104dc (ACCOUNT 3 (CREDIT)) is within $25 of a spending limit, and to use funding source 104de (ACCOUNT 5 (CREDIT)) for any purchase between $250.01 and $500.00 if the funding source 104dc (ACCOUNT 1 (BANK)) is within $25 of a spending limit and the funding source 104dc (ACCOUNT 3 (CREDIT)) is below $1000 dollars. For example, the payer may desire that larger intermediate purchases (e.g., a purchase amount range between $250.01 and $500.00) be paid for using a credit account (i.e., ACCOUNT 3 (CREDIT)) unless the credit account is close to its spending limit and, if it is, to use a bank account (ACCOUNT 1 (BANK)) but, if the bank account it below $1000, then to use another credit account (ACCOUNT 5 (CREDIT)) that may not be used often and can handle a large single purchase, and the spending gate conditions 106f and 106g modify the spending gate definition 104j to provide that instruction to the payment service provider.

Figure 1G:
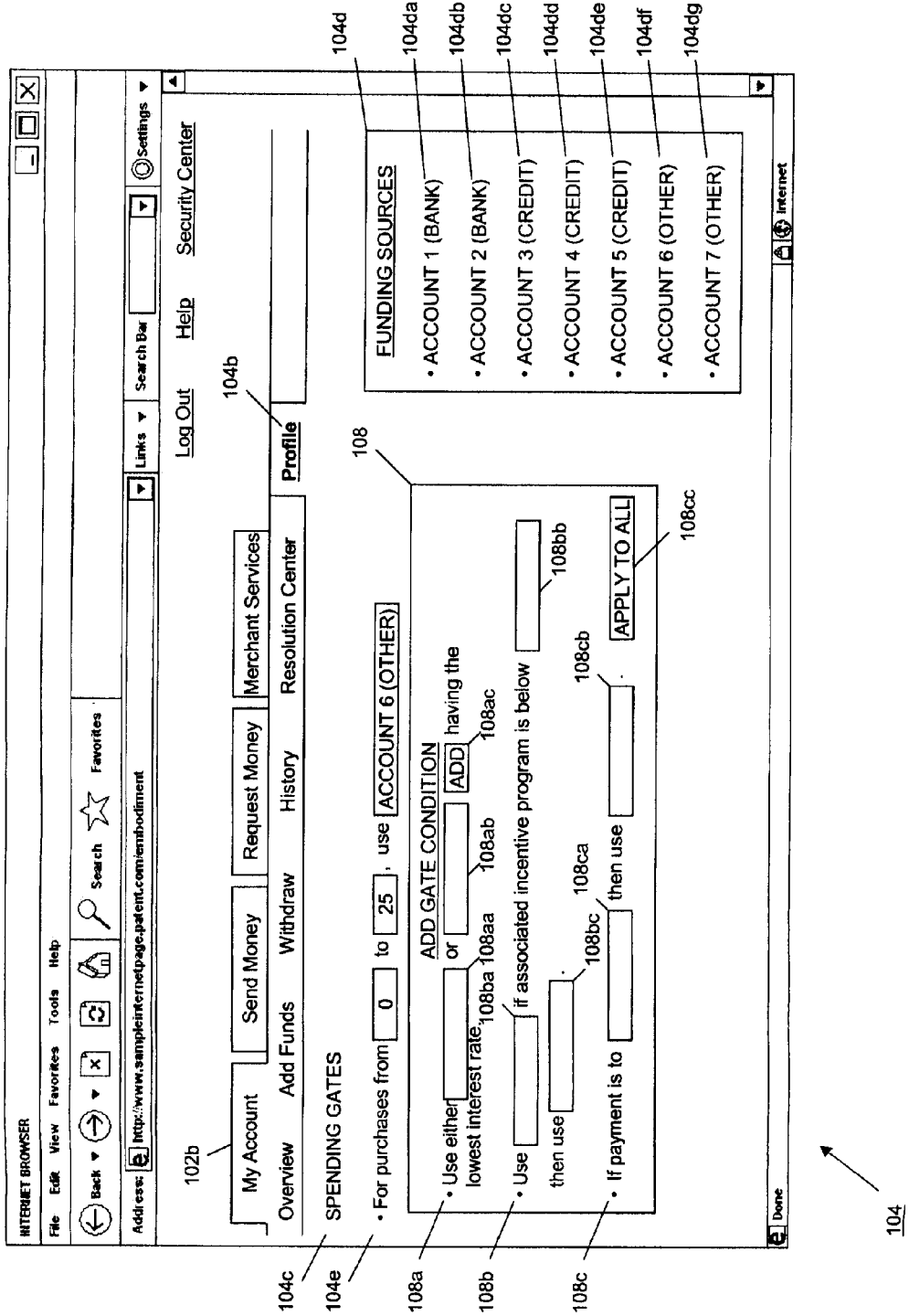
FIG. 1g is a screenshot view illustrating an embodiment of a payer account website with a plurality of editable conditions for a spending gate definition.
Figure 1H:
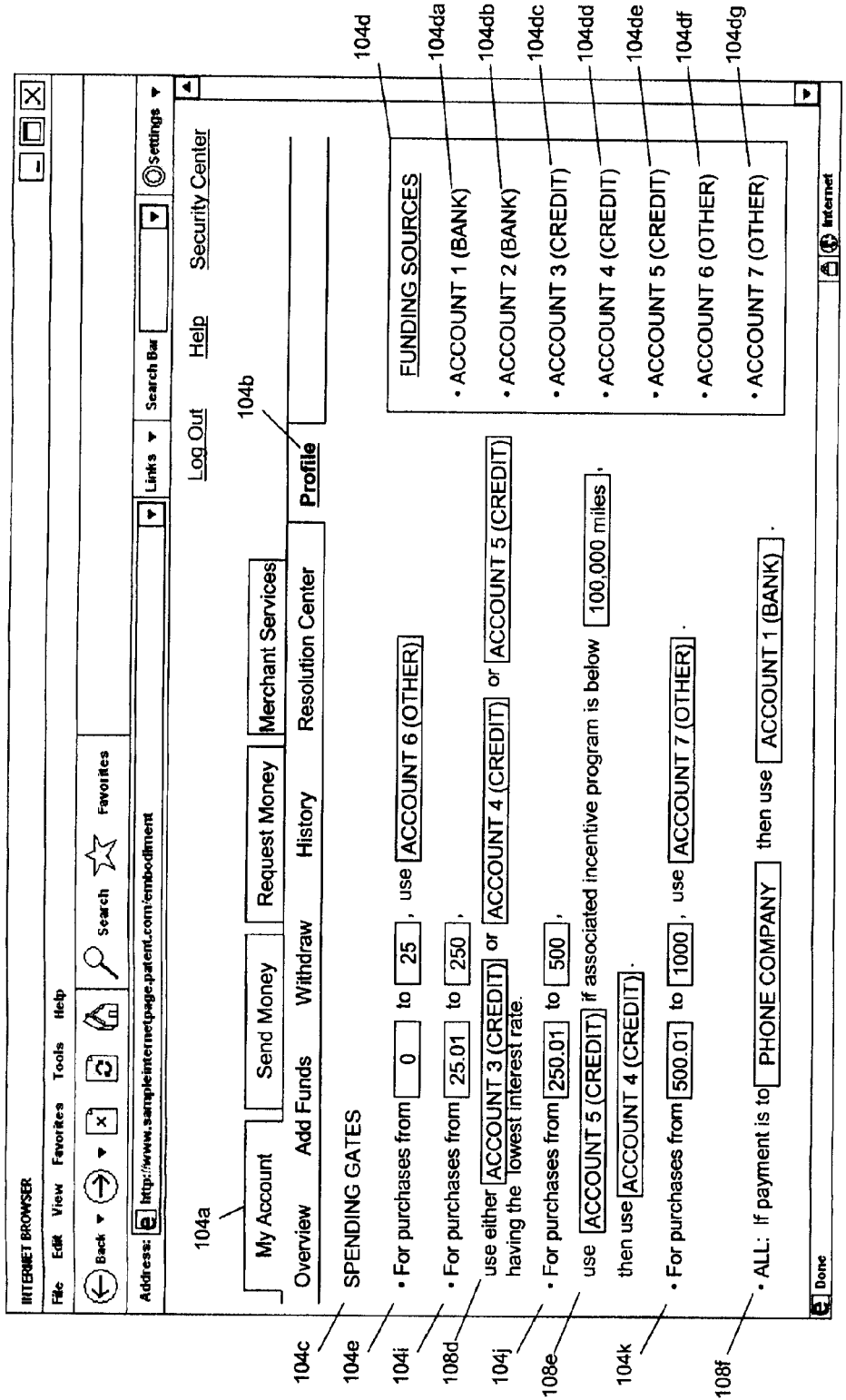
FIG. 1h is a screenshot view illustrating an embodiment of a payer account website with a plurality of spending gate definitions including spending gate conditions.

Referring now to FIG. 1g and 1h, in another embodiment, the payer may select the Add Gate Condition link 104g in the Add Gate button 104ce of FIG. 1b subsequent to creating any spending gate definition (e.g., the spending gate definitions 104e, 104i, 104j, and 104k.) Selection of the Add Gate Condition link 104g presents the payer with an Add Gate Condition box 108 that includes a plurality of editable conditions 108a, 108b and 108c, as illustrated in FIG. 1g. The editable condition 108a includes a plurality of input fields 108aa and 108ab along with an Add button 108ac, the editable condition 108b includes a plurality of input fields 108ba, 108bb, and 108bc, and the editable condition 108c includes a plurality of input fields 108ca and 108cb along with an Apply To All button 108cc.

The payer may use the payer account website 104 by selecting one of the editable conditions 108a, 108b, or 108c and filling in the plurality of input fields associated with that editable condition with the appropriate information and using the buttons when necessary (e.g., selecting a funding source for input fields 108aa, 108ab, 108ba, 108bc, and 108cb, inputting an incentive program level in input field 108bb, inputting a payee in input field 108ca, selecting the Add button 108ac to add a funding source input field to editable condition 108a, and selecting the Apply To All button 108cc to apply the editable condition 108c to all the spending definitions.)

For example, in the embodiment illustrated in FIG. 1h, the payer has used the editable condition 108a of FIG. 1g to add a spending gate condition 108d to the spending gate definition 104i that instructs the payment service provider to use a funding source, selected from funding sources 104dc (ACCOUNT 3 (CREDIT)), 104dd (ACCOUNT 4 (CREDIT)), and 104de (ACCOUNT 5 (CREDIT)), that has the lowest interest rate for any purchase between $25.01 to $250.00. One of skill in the art will recognize that the payer has selected the Add button 108ac of editable condition 108a to include the three funding sources 104dc, 104dd, and 104de in the spending gate condition 108d and that the payer may do the same to add as many funding sources to similar spending gate conditions as is desired. For example, the payer may desire that smaller intermediate purchases (e.g., a purchase amount range between $25.01 and $250.00) be paid for using the credit account of the payer that has the lowest interest rate, and the spending gate condition 108d modifies the spending gate definition 104i to provide that instruction to the payment service provider.

The payer has also used editable condition 108b of FIG. 1g to create a spending gate definition 104j that instructs the payment service provider to use funding source 104de (ACCOUNT 5 (CREDIT)) for any purchase between $250.01 and $500.00 if an incentive program associated with that funding source is below 100,000 miles, and if the incentive program is not below 100,000 miles, then to use funding source 104dd (ACCOUNT 4 (CREDIT)). For example, the payer may desire that larger intermediate purchases (e.g., a purchase amount range between $250.01 and $500.00) be paid for using a credit account (i.e., ACCOUNT 5 (CREDIT)) until an incentive associated with that credit account (in the illustrated embodiment, airline miles) is achieved, and then once that incentive is achieved, to use a credit account (ACCOUNT 4 (CREDIT)) that may have a different incentive program that the payer then wishes to receive an incentive from, and the spending gate conditions 108e modifies the spending gate definition 104j to provide that instruction to the payment service provider.

The payer has also used editable condition 108c of FIG. 1g to create a spending gate condition 108f that instructs the payment service provider to use funding source 104da (ACCOUNT 1 (BANK)) for any purchase from a specific payee (in the illustrated embodiment, PHONE COMPANY.) One of skill in the art will recognize that the payer has selected the Apply To All button 108c to apply the spending gate condition to all spending gate definitions, and that similar spending gate conditions may be applied to only one or some spending gate definitions. For example, the payer may desire that any bill from a specific payee (PHONE COMPANY) be paid for with a specific funding source (ACCOUNT 1 (BANK)) regardless of the payment amount, and the spending gate condition 108f modifies all the spending gate definitions 104e, 104i, 104j, and 104k to provide that instruction to the payment service provider.

While a plurality of spending gate conditions 106d, 106e, 106f, 106g, 108d, 108e, and 108f have been illustrated and discussed, one of skill in the art will recognize that a plurality of other spending gate conditions may be created using the techniques described above without departing from the scope of the present disclosure. Furthermore, the spending gate conditions may be used alone and/or with spending gate definitions without departing from the scope of the present disclosure.

Figure 1I:
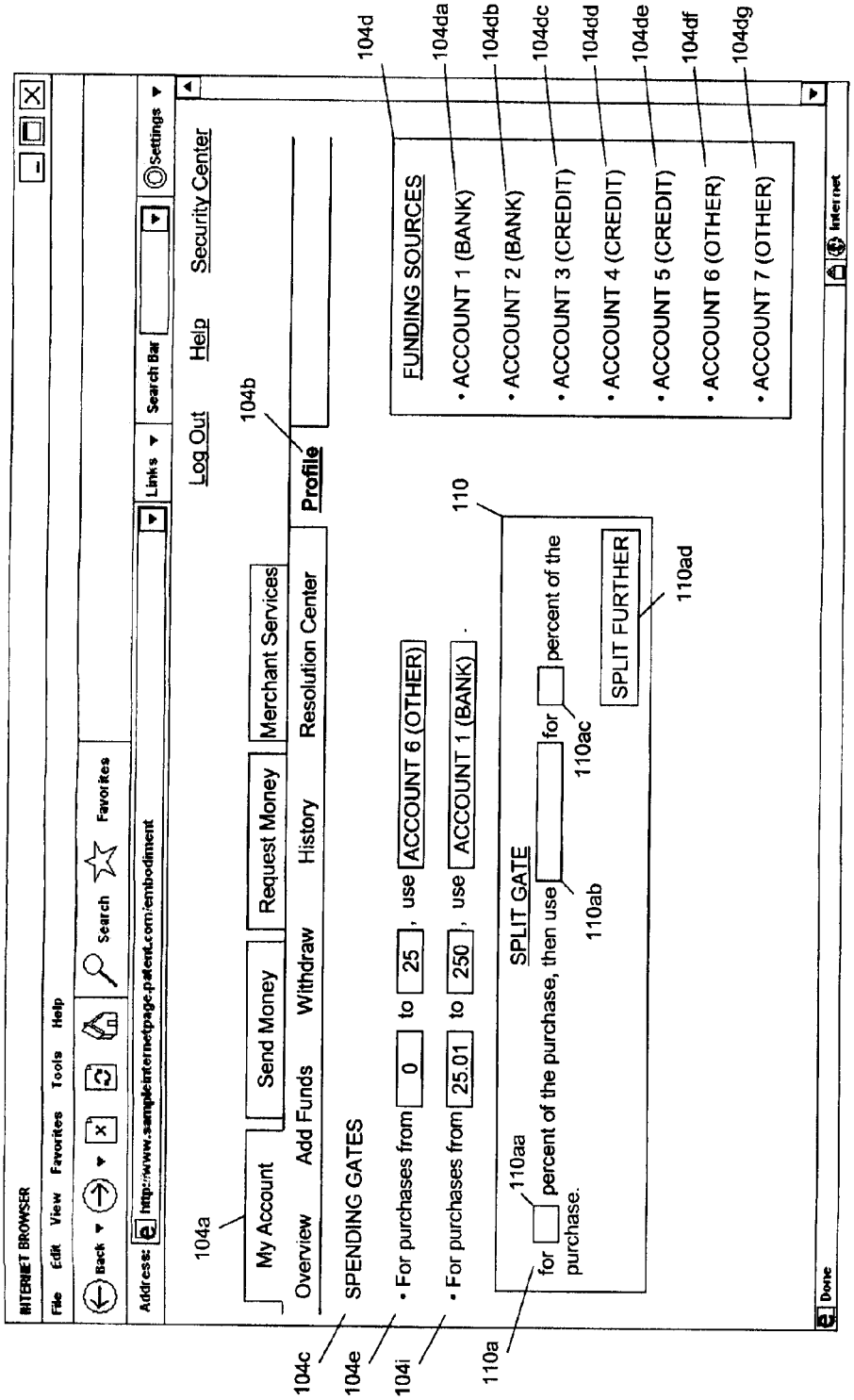
FIG. 1i is a screenshot view illustrating an embodiment of a payer account website with an editable gate splitter for a spending gate definition.
Figure 1J:
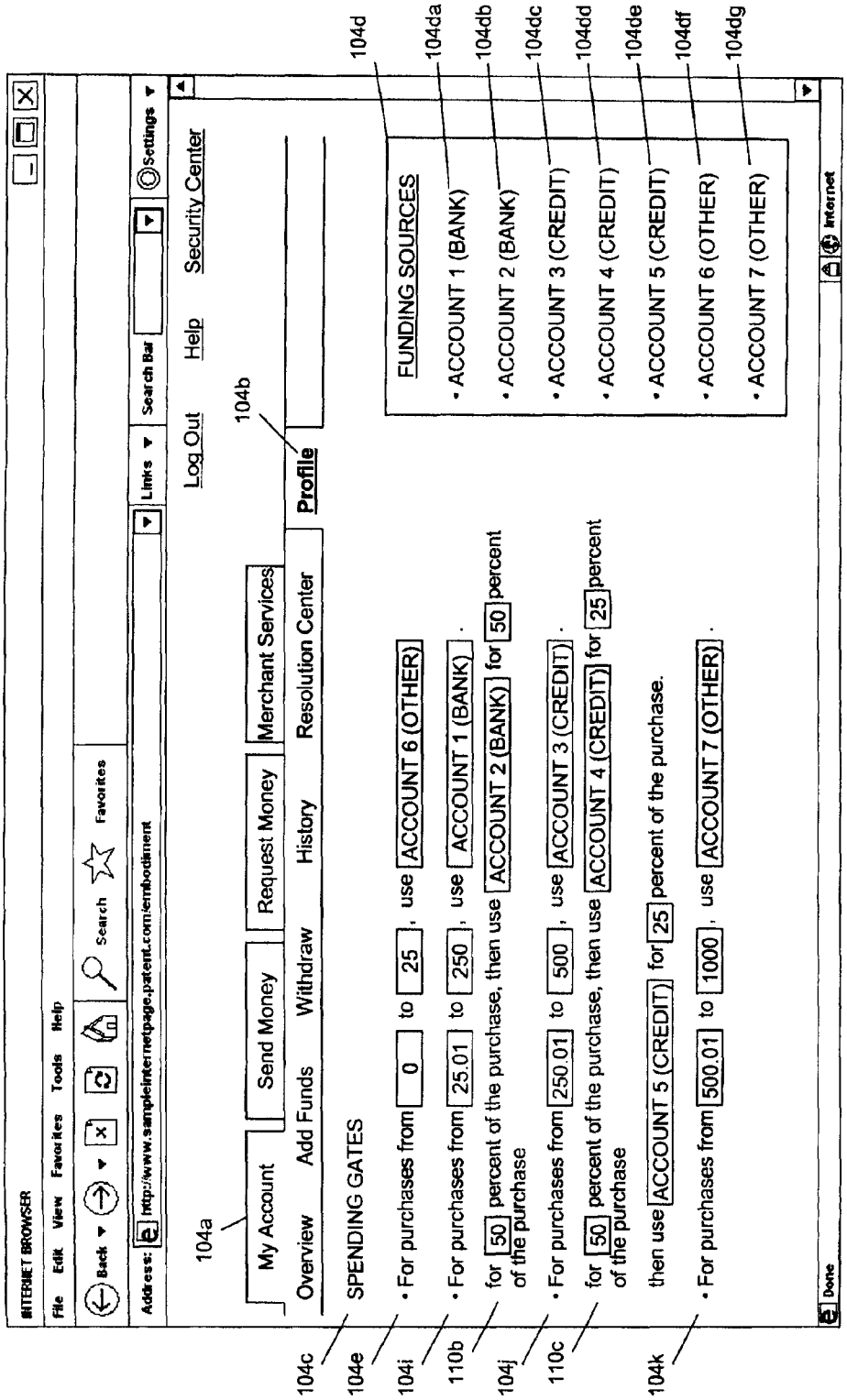
FIG. 1j is a screenshot view illustrating an embodiment of a payer account website with a plurality of spending gate definitions including gate splits.

Referring now to FIG. 1i and 1j, the payer may select the Split Gate link 104h in the Add Gate button 104ce of FIG. 1b subsequent to creating any spending gate definition (e.g., the spending gate definitions 104e, 104i, 104j, and 104k.) Selection of the Split Gate link 104h presents the payer with a Split Gate box 110 that includes an editable gate splitter 110a, as illustrated in FIG. 1i. The editable gate splitter 110a includes a plurality of input fields 110aa, 110ab, and 110ac along with a Split Further button 110ad.

The payer may use the payer account website 104 by selecting the editable gate splitter 110a and filling in the plurality of input fields associated with that editable condition with the appropriate information and using the buttons when necessary (e.g., selecting a funding source for input field 110ab, inputting a percentage in input fields 110aa and 110ac, and selecting the Split Further button 110ad to add more input fields for splitting a spending definition purchase between additional funding sources.)

For example, in the embodiment illustrated in FIG. 1j, the payer has used the editable gate splitter 110a of FIG. 1i to add a gate splitter 110b to the spending gate definition 104ie that instructs the payment service provider to use funding source 104da (ACCOUNT 1 (BANK)) for 50% any purchase between $25.01 and $250.00 and to use funding source 104db (ACCOUNT 2 (BANK)) for the other 50% of that purchase. For example, the payer may desire that payments for smaller intermediate purchases (e.g., a purchase amount range between $25.01 and $250.00) be split evenly between funding sources (ACCOUNT 1 (BANK)) and (ACCOUNT 2 (BANK)), and the gate splitter 110b modifies the spending gate definition 104i to provide that instruction to the payment service provider.

The payer has also used editable gate splitter 110a of FIG. 1i to add a gate splitter 110b to the spending gate definition 104j that instructs the payment service provider to use funding source 104dc (ACCOUNT 3 (CREDIT)) for 50% any purchase between $250.01 and $500.00, to use funding source 104dd (ACCOUNT 4 (CREDIT)) for 25% of that purchase, and to use funding source 104de (ACCOUNT 5 (CREDIT)) for 25% of that purchase. One of skill in the art will recognize that the payer has selected the Split Further button 110ad to include the three funding sources 104dc, 104dd, and 104de at specific percentages for payments, and that the payer may do the same to split payments between any number of funding sources at any percentages desired. For example, the payer may desire that payments for larger intermediate purchases (e.g., a purchase amount range between $250.01 and $500.00) be split between funding sources (ACCOUNT 3 (CREDIT), ACCOUNT 4 (CREDIT), and ACCOUNT 5 (CREDIT)) in specific percentages, and the gate splitter 110c modifies the spending gate definition 104j to provide that instruction to the payment service provider.

While a plurality of gate splitters 110b and 110c have been illustrated and discussed, one of skill in the art will recognize that a plurality of other gate splits may be created using the techniques described above without departing from the scope of the present disclosure. Furthermore, the gate splitters may be used alone and/or with the spending gate conditions and/or spending gate definitions without departing from the scope of the present disclosure.

Referring back to FIG. 1a, the method 100 then proceeds to block 112 where the plurality of spending gate definitions are stored in a database. The payments service provider may take all the spending gate definitions (including spending gate conditions, gate splitters, etc.) and store those in a payer database. In an embodiment, the spending gate definitions are associated with the payer account that they were created for. The method 100 then proceeds to block 114 where a payment request including a payment amount is received. Subsequent to the creation of the plurality of spending gates, the payer may make a purchase using their payer account, and in response, a payment request for that purchase that includes a payment amount for the purchase is sent to the payment service provider. For example, a payment amount of $100 for a purchase made using the payer account may be received.

The method 100 then proceeds to block 116 where it is determined that the payment amount corresponds to a purchase amount range. The payment service provider may use information from the payer account along with the payment amount to access the spending gate definitions in the database and determine that the payment amount corresponds to a purchase amount range included in one of the spending definitions. In the example where the payment amount received is $100, the payment service provider may access the database and determine that the $100 payment amount corresponds to the purchase amount range of $25.01 to $250.00. The method 100 then proceeds to block 118 where payment is made using one or more funding sources associated with the purchase amount range determined in block 116.

In the example where the payment amount received is $100 and the purchase amount range is $25.01 to $250.00, the payment service provider may access the spending definition 104i illustrated in FIG. 1d and use the funding source 104da (ACCOUNT 1 (BANK)) to make the payment. In another embodiment, the payment service provider may access the spending definition 104i illustrated in FIG. 1f and use the funding source 104da (ACCOUNT 1 (BANK)) to make the payment unless the funding source 104da is below $300, and if the funding source 104da is below $300, then use the funding source 104dd (ACCOUNT 4 (CREDIT)) to make the payment. In another embodiment, the payment service provider may access the spending definition 104i illustrated in FIG. 1h and use the funding source, selected from the funding sources 104dc (ACCOUNT 3 (CREDIT)), 104dd (ACCOUNT 4 (CREDIT)), or 104de (ACCOUNT 5 (CREDIT)), that has the lowest interest rate to make the payment. In an embodiment, the payment service provider may have account balance information or interest rate information for the funding sources in a database, or may retrieve the account balance information or interest rate information for the funding sources over a network. In another embodiment, the payment service provider may access the spending definition 104i illustrated in FIG. 1j and use the funding source 104da (ACCOUNT 1 (BANK)) to make the 50% of the payment and funding source 104db (ACCOUNT 2 (BANK)) to make the other 50% of the payment.

Thus, a system and method are described that allow a payer to define different funding sources for different purchases and precisely control how purchases are paid for. While a plurality of examples have been discussed above, one of skill in the art will recognize that the present disclosure is not so limited, and a variety of other embodiments will fall within its scope. As discussed above with respect to the spending gate definition that selects a funding source with the lowest interest rate or determines a funding source balance, the payment service provider may keep funding source information for funding sources in a database, or may retrieve such information over a network when needed. Other funding source information may include funding source spending limits, incentive program points/miles/etc., and a variety of other funding source information known in the art.

While the embodiment of the method above is directed to making a payment using a plurality of spending gates, the gates are not so limited and may instead be referred to as transaction gates that may define how a variety of transactions are dealt with by the payment service provider. For example, a transaction gate may define different funding sources for refunds, and when a refund is to be refunded to a payer (e.g., by a payee or the payment provider,) it will be drawn from an account determined using transaction gates that are substantially similar to the spending gates described above. In another example, a transaction gate may defined how a payment or credit should be received by defining different accounts for different payments or credits, and when a payment or credit is received, it will be deposited into an account determined using transaction gates that are substantially similar to the spending gates described above. One of skill in the art will recognize how a variety of transactions and transaction gates may be substituted for the spending gates in the embodiment of the method described above without departing from the scope of the present disclosure.

Referring now to FIGS. 2a, 2b, 2c, and 2d, a method 200 for making a payment using an RFID system is illustrated and will be described. In an embodiment, the payer may be provided with one or more physical RFID devices from payees, account providers, and/or payment service providers. In an embodiment, each RFID device includes an RFID tag that has been programmed with an RFID identifier such as, for example, an account number. The RFID tag is operable to transmit the RFID identifier to a payer device as discussed above to use an account associated with the account number to pay for a purchase. In an embodiment, an RFID device may include a card with an embedded RFID tag, a keychain "dongle" with an embedded RFID tag, and/or a variety of other RFID devices known in the art (e.g., a coffee shop may provide a reuseable coffee cup with an embedded RFID tag.)

The method 200 begins at block 202 where an RFID identifier is associated with a payer account in a database. FIG. 2b illustrates an embodiment of a screenshot of a payer account website 200 that is similar to the payer account website 104 discussed above that allows a payer to provide a plurality of spending definitions to a payment service provider. As discussed above, the payer account website 200 may be provided by the payment service provider and accessed by the payer using networked computer systems, and one of skill in the art will recognize that the payer may provide a variety of information (e.g., a login ID, a password, etc.) to gain access to the payer account website 200 having one or more web pages as described below. The illustrated embodiment of the payer account website 200 includes a My Account tab 202 having an RFID preferences section 204. The RFID preferences section 204 includes a master RFID section 206 and a linked RFID section 208. The master RFID section 206 includes an RFID identifier input 206a, a modify funding preferences link 206b, and a modify information preferences links 206c. The linked RFID section 208 includes a plurality of RFID identifier inputs 208a and associated modify funding preferences links 208b, and modify information preferences links 208c

As discussed above, the payer may possesses a plurality of physical RFID devices. In the embodiment illustrated in FIG. 2b, the payer has provided a master RFID identifier in the RFID identifier input 206a of the master RFID section 206, and a linked RFID identifier in each of the RFID identifier inputs 208a in the linked RFID section 208. Upon receiving the master RFID identifier in the RFID identifier input 206a of the master RFID section 206, the payment service provider may associate the master RFID identifier with the payer account in a database. Furthermore, upon receiving the linked RFID identifiers in the RFID identifier inputs 208a in the linked RFID section 208, the payment service provider may associate those linked RFID identifiers with the master RFID identifier in the database. As discussed in further detail below, the association of the linked RFID identifiers with the master RFID identifier allows a payer to carry only one physical RFID device (i.e., the "master" RFID device that includes the master RFID identifier) and use that RFID device with a plurality of payees that may have provided the payer with linked RFID devices having the linked RFID identifiers. As also discussed in further detail below, the association of the linked RFID identifiers with the master RFID identifier may also allow a payer to provide a single set of spending definitions (e.g., associated with the master RFID identifier) that are to be applied when using any of the RFID devices (e.g., the master or linked RFID devices.)

Figure 2A:
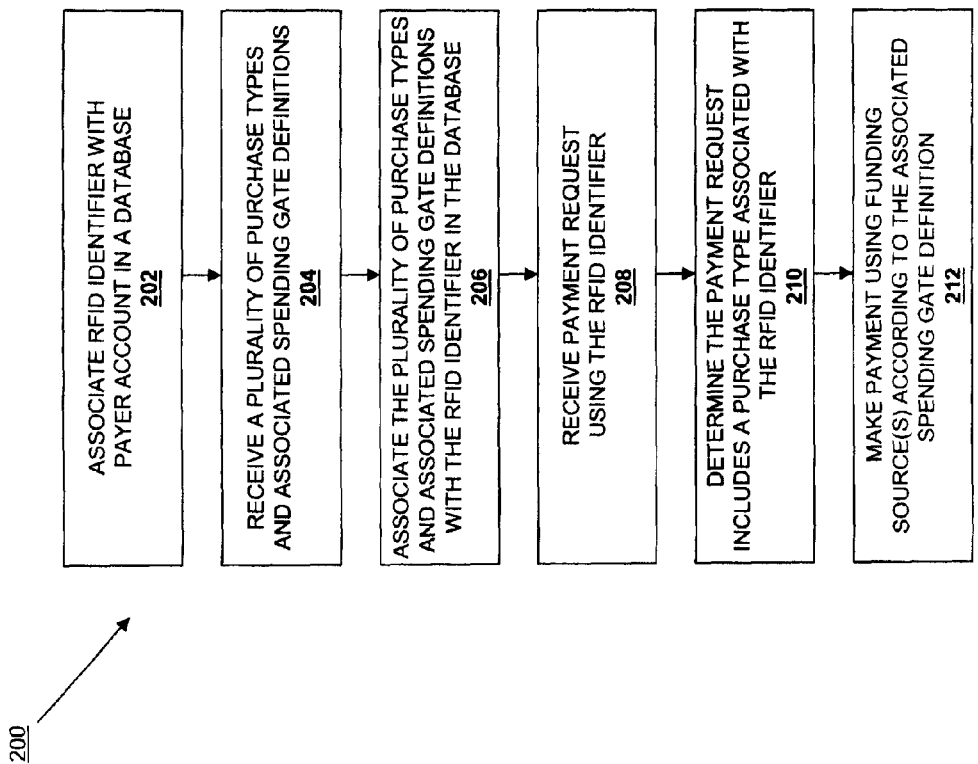
FIG. 2a is a flow chart illustrated an embodiment of a method for making a payment.
Figure 2B:
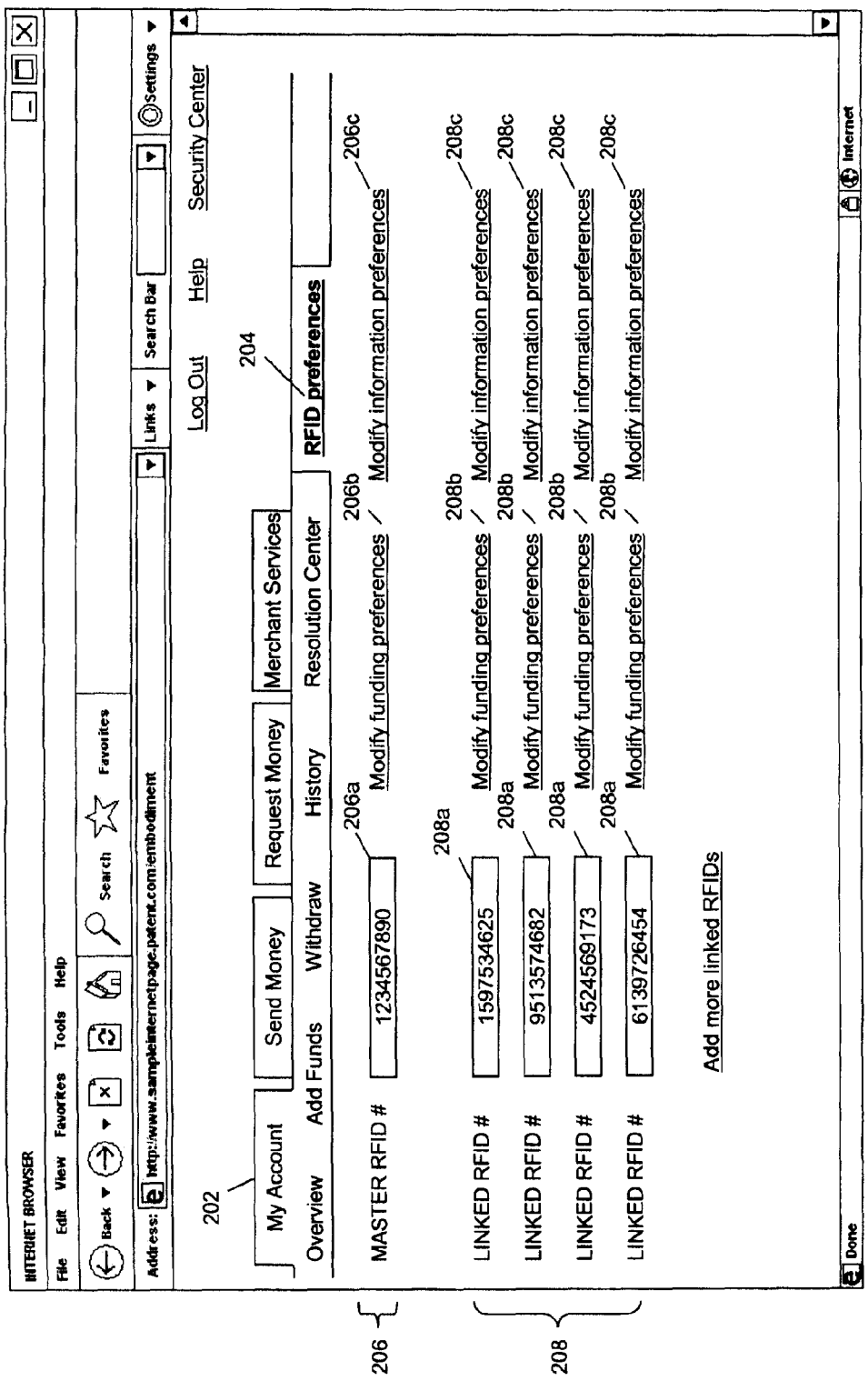
FIG. 2b is a screenshot view illustrating an embodiment of a payer account website for associating a plurality of RFID identifiers with a payer account and each other.
Figure 2C:
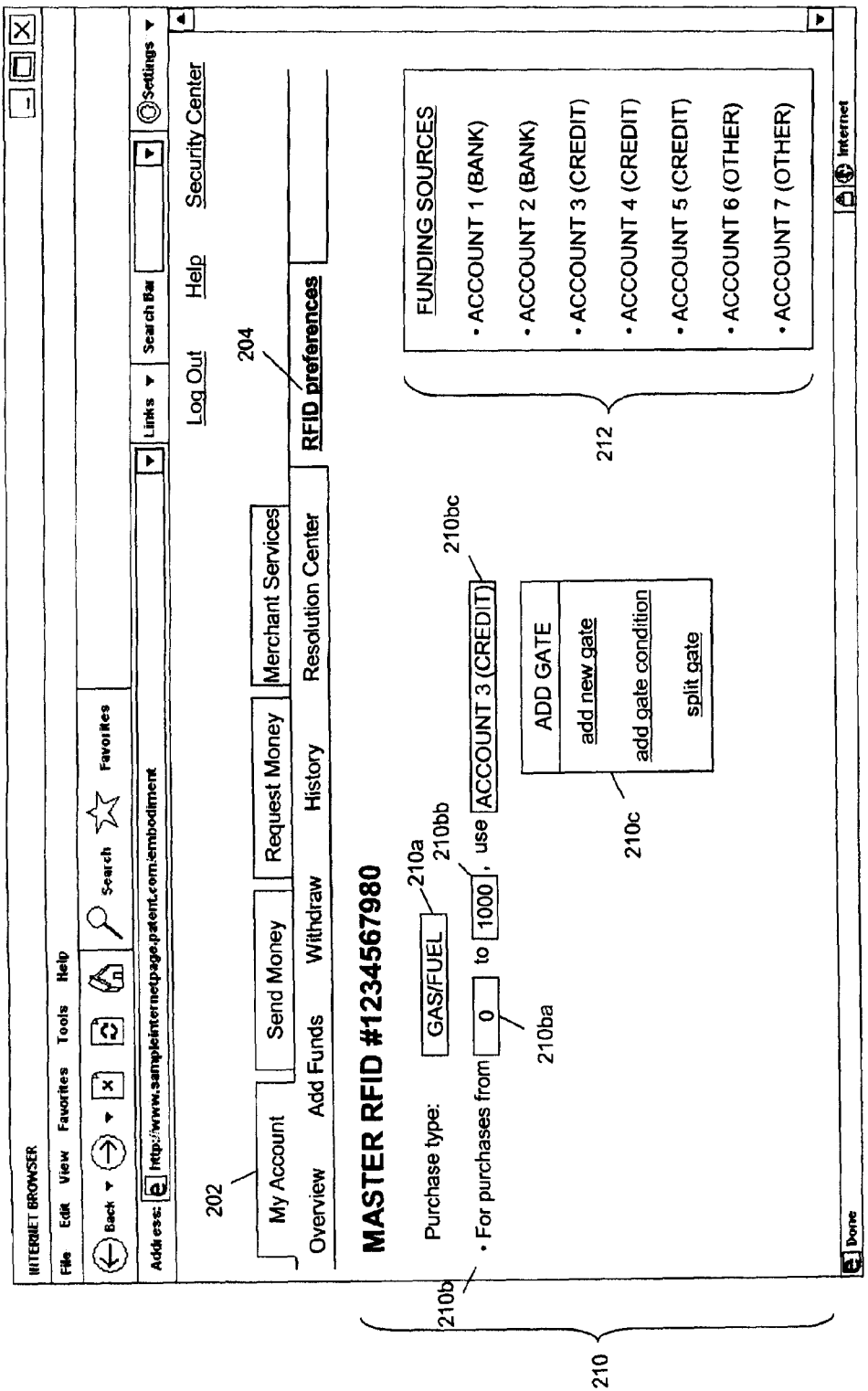
FIG. 2c is a screenshot view illustrating an embodiment of a payer account website with a purchase type spending gate and an associated spending gate definition.
Figure 2D:
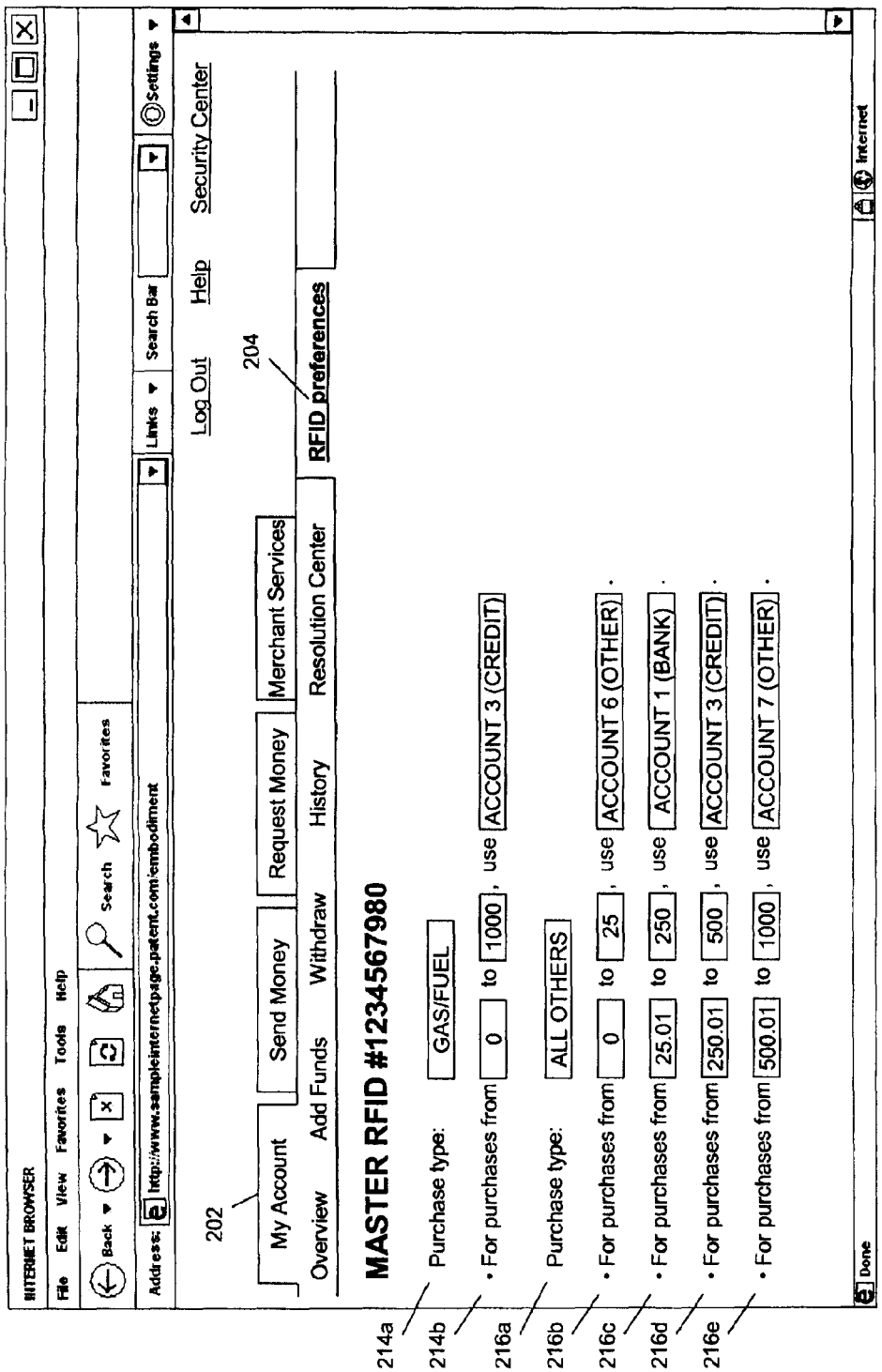
FIG. 2d is a screenshot view illustrating an embodiment of a payer account website with a plurality of purchase type spending gates and associated spending gate definitions.

Referring now to FIGS. 2a, 2c, and 2d, the method 200 then proceeds to blocks 204 and 206 where a plurality of purchase types and spending gate definitions are received and associated with an RFID identifier. In an embodiment, in response to the payer selecting the modify funding preferences link 206a in the master RFID section 206, the payer may be presented with a master RFID spending gate section 210 and a funding sources section 212. The master RFID spending gate section 210 includes a purchase type input 210a, an editable spending gate definition 210b having a plurality of input fields 210ba, 210bb, and 210bc, and an Add Gate button 210c. The funding sources section 212 includes a plurality of funding sources 212a, 212b, 212c, 212d, 212e, 212f, and 212g. The purchase type input 210a allows a payer to provide a purchase type, and the editable spending gate definition 210b, Add gate button 210c, and funding sources section 212 operate substantially similarly to the editable spending gate definition 104ca, Add Gate button 104ce, and funding sources section 104d described above with reference to FIG. 1b. Thus, the master RFID spending gate section 210 allows the payer to define purchase types and spending gate definitions to be used by the payment service provider when the master RFID identifier (or, in an embodiment, one of the associated linked RFID identifiers) is received, and those purchase types and spending gate definitions may then be sent to the payment service provider to be associated with a payer account and the master RFID identifier.

For example, in the embodiment illustrated in FIG. 2d, the payer has used the purchase type input 210a in FIG. 2c to create a plurality of purchase types 214a and 216a, and then used the editable spending gate definition 210b to create a spending gate definition 214b for the purchase type 214a and spending gate definitions 216b, 216c, 216d, and 216e for the purchase type 216a. Thus, for purchase types categorized as "GAS/FUEL", the payer has created a spending gate definition 214b that instructs the payment service provider to use a specific funding source (ACCOUNT 3 (CREDIT)) for any "GAS/FUEL" purchase up to $1000.00. For all other purchase types, the payer has provided a spending gate definition 216b that instructs the payment service provider to use a first funding source (ACCOUNT 6 (OTHER)) for purchases between $0.00 and $25.00, a spending gate definition 216c that instructs the payment service provider to use a second funding source (ACCOUNT 1 (BANK)) for purchases between $25.01 and $250.00, a spending gate definition 216d that instructs the payment service provider to use a third funding source (ACCOUNT 3 (CREDIT)) for any purchase between $250.01 and $500.00, and a spending gate definition 216e that instructs the payment service provider to use a fourth funding source (ACCOUNT 7 (OTHER)) for any purchase between $500.01 and $1000.00. Furthermore, each of the spending gate definitions may be modified using the gate conditions and gate splitting, discussed above, using the Add Gate button 210c. The purchase types and spending gate definitions may then be sent by the payer to the payment service provider (e.g., from a payer device to the payment service provider device over a network) and associated with the payer account.

In another embodiment, purchase types and spending gate definitions may be determined by the payment service provider and provided or suggested to the payer. For example, the payment service provider may review a purchase history of a payments by the payer for a plurality of purchases and use that purchase history to provide or suggest purchase types and associated spending gate definitions. Referring to the embodiment illustrated in FIG. 2d, the payment service provider may review the purchase history and determine that for purchases for "GAS/FUEL", the payer has predominantly used ACCOUNT 3(CREDIT) (and, for example, no purchase has ever exceeded $1000), and suggest or provide the purchase type 214a and spending gate definition 214b. The payment service provider may review the purchase history and determine that for all non "GAS/FUEL" purchases, the payer has predominantly used ACCOUNT 6(OTHER) for purchases under $25, ACCOUNT 1 (BANK) for purchases between $25.01 and $250, ACCOUNT 3 (CREDIT) for purchases between $250.01 and $500, and ACCOUNT 7 (OTHER) for purchases between $500.01 and $1000 (and, for example, no purchase has ever exceeded $1000), and suggest or provide the purchase type 216a and spending gate definitions 216b, 216c, 216d, and 216e.

In another embodiment, the purchase types may also include times and/or dates. For example, the payer may apply the spending gate definition 214b for purchases made between Monday morning through Friday afternoon, while applying the spending gate definitions 216b, 216c, 216d, and 216e for purchases made between Friday afternoon and Monday morning.

While purchase types and spending gate definitions have been illustrated and described as being provided for and associated with a master RFID identifier, purchase types and spending gate definitions may also be provided for and associated with the linked RFID identifiers discussed above in substantially the same manner (e.g., using the modify funding preferences links 208b in the linked RFID section 208.) Furthermore, one or more of the linked RFID identifiers may be set up to use purchase types and spending gate definitions that are associated with the master RFID identifier, which allows one set of purchase types and spending gate definitions to be created for the master RFID identifier and then used for purchases made with any of the linked RFID identifiers.

The method 200 then proceeds to block 208 where a payment request using an RFID identifier is received. In making a purchase from a payee, the payer may use a RFID device with a payee device in order to provide the RFID identifier associated with that RFID device to the payee device. In response to receiving the RFID identifier, the payee device may then transmit a payment request to the payment service provider that includes the RFID identifier, purchase information (e.g., information about what is being purchased, the amount of the purchase, etc.), and/or payee information (e.g., the name of the payee, an identifier associated with the payee, etc.) For example, the payer may have the master RFID device in their possession, and may use that master RFID device to provide its master RFID identifier to a payee device of a payee that has previously provided the payer with one of the linked RFID devices. In another example, the payer may have a linked RFID device in their possession, and may use that linked RFID device to provide its linked RFID identifier to a payee that has previously provided the payer with that linked RFID device. In either example, the RFID identifier is received by a payment service provider device from the payee device over a network along with purchase information and/or payee information.

The method 200 then proceeds to block 210 where it is determined that the payment request includes a purchase type associated an RFID identifier. In an embodiment, the payment service provider device may review the payment request received from the payee device to determine a purchase type being made (e.g., using the purchase information included in the payment request), and then may access a database to determine if that purchase type is associated with a spending gate definition as discussed above.

In one embodiment, the payer may only have a single RFID device that includes the purchase types and associated spending gate definitions discussed above (i.e., the payer may not have any RFID devices with linked RFID identifiers.) When that RFID device is used to make a purchase, its RFID identifier is received by the payment service provider device in a payment request that also includes purchase information with a purchase type. The payment service provider device may then use the RFID identifier to access a database to determine whether the purchase type in the payment request corresponds to any purchase types associated with that RFID identifier. If the purchase type in the payment request corresponds to a purchase type associated with the RFID identifier, the payment service provider may then retrieve the spending gate definitions associated with the purchase type. In an embodiment, the RFID identifier may include spending gate definitions with purchase amount ranges but no associated purchase type (e.g., the spending ate definitions discussed above with reference to FIGS. 1a-1j.) Thus, a payer may have a single RFID device that they may use to make payments from a plurality of different funding sources (according to the purchase types and/or spending gate definitions discussed above.)

Using the example illustrated in FIG. 2d, the payment service provider may receive a payment request including the RFID identifier "1234567890" that has had the purchase types 214a and 216a and their associated spending gate definitions 214b, 216b, 216c, 216d, and 216e associated with it. The payment service provider device may then determine the purchase type of the purchase being made from the purchase information in the payment request. If that purchase type is "GAS/FUEL", the payment service provider device retrieves the spending gate definition 214b, while if that purchase type is not "GAS/FUEL the payment service provider device retrieves the spending gate definitions 216b, 216c, 216d, and 216e.

In another embodiment, the payer may use the master RFID device to make a purchase from a payee that has previously provided the payer one of the linked RFID devices. The RFID tag in the master RFID device will transmit the master RFID identifier to a payee device, which then provides that master RFID identifier to the payment service provider device along with purchase information and payee information. The payment service provider may then use the master RFID identifier and the payee information from the payment request to determine which of the linked RFID identifiers that are associated with the master RFID identifier was provided to the payer by the payee. For example, the payment service provider device may use the master RFID identifier to determine the plurality of linked RFID identifiers associated with that master RFID identifier (as discussed above with reference to FIG. 2b.) The payment service provider device may then use the payee information to determine which of the linked RFID identifiers is associated with the payee from whom the purchase is currently being made. The payment service provider may then use that linked RFID identifier and the purchase information in the payment request to determine if the purchase being made is for a purchase type associated with the linked RFID identifier and, if so, retrieve the spending gate definition(s) that are associated with that purchase type.

In another embodiment, the payer may use one of the linked RFID devices to make a purchase from a payee that has previously provided the payer with that linked RFID device. The RFID tag in the linked RFID device will transmit the linked RFID identifier to a payee device, which then provides that linked RFID identifier to the payment service provider device along with purchase information and payee information. The payment service provider may then use the linked RFID identifier from the payment request to determine if the linked RFID identifier is associated with a master RFID identifier that has associated purchase types and/or spending gate definitions. For example, the payment service provider device may use the linked RFID identifier to determine if it is associated in the database with a master RFID identifier (as discussed above with reference to FIG. 2b.) The payment service provider device may then determine whether that that linked RFID identifier has associated purchase types and/or spending gate definitions, or whether that linked RFID identifier is set to use purchase types and/or spending gate definitions that are associated with a master RFID identifier. If the linked RFID identifier has associated purchase types and/or spending gate definitions, the payment service provider device may determine whether the purchase type in the payment request corresponds to any purchase types associated with the linked RFID identifier substantially as discussed above and, if so, retrieve the associated spending gate definitions. If the linked RFID identifier is set to use purchase types and/or spending gate definitions that are associated with a master RFID identifier, the payment service provider device may determine whether the purchase type in the payment request corresponds to any purchase types associated with the master RFID identifier substantially as discussed above and, if so, retrieve the associated spending gate definitions.

The method then proceeds to block 212 where a payment is made using funding sources according to at least one associated spending gate definition. As discussed above, in response to receiving the payment request, the payment service provider device may use the RFID identifier and purchase type to retrieve at least one spending definition. The payment service provider device may then use a purchase amount included in the payment request to determine which of a plurality of funding sources to use to make the payment according to the at least one spending definition. Using the example illustrated in FIG. 2d, at block 210, if the payment service provider device determines that the purchase type is "GAS/FUEL", the payment service provider device uses ACCOUNT 3 (CREDIT) to make the payment. If the payment service provider device determines that the purchase type is not "GAS/FUEL", the payment service provider device may use the purchase amount in the payment request to determine which funding source to use to make the payment (e.g., if the purchase amount is $50, ACCOUNT 1(BANK) would be used to make the payment.

Thus, a system and method are provided that allow a payer to use an RFID device to make a purchase, and the funding source used to pay for that purchase may be automatically determined based on a purchase type and/or a purchase amount. A plurality of RFID identifiers may be associated with a single RFID identifier such that a payer need only carry one RFID device to make payments using any of a plurality of RFID identifiers associated with respective RFID devices. The association of the plurality of RFID identifiers with a single RFID identifier also allows the funding source determination for purchases made using any of the RFID identifiers to be made using spending gate definitions that have been associated with a single RFID identifier.

Figure 3A:
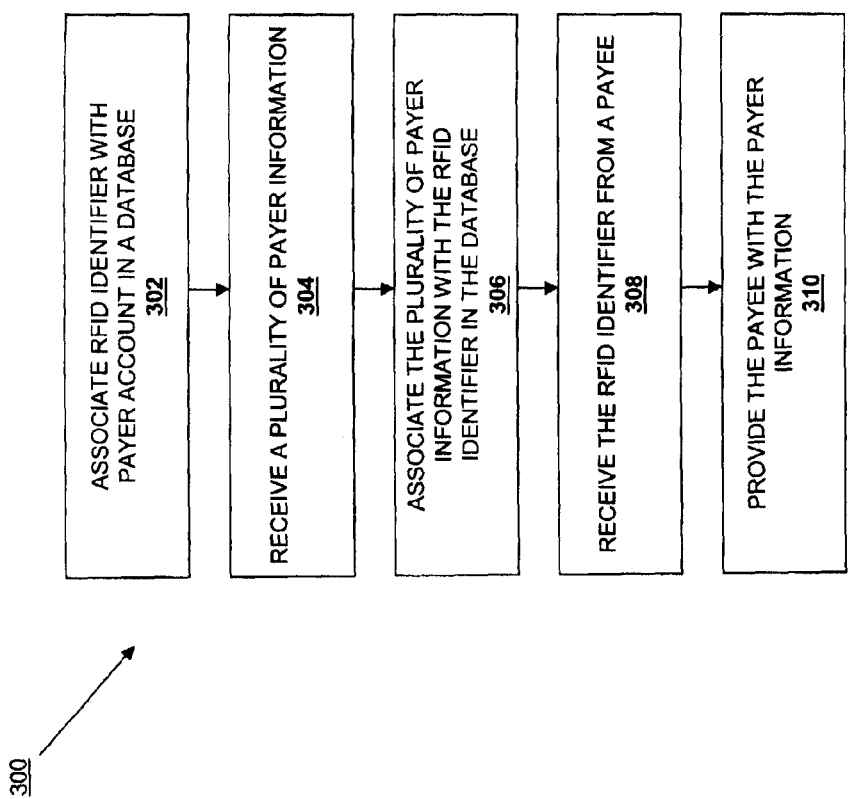
FIG. 3a is a flow chart illustrated an embodiment of a method for providing a payee with payer information.
Figure 3B:
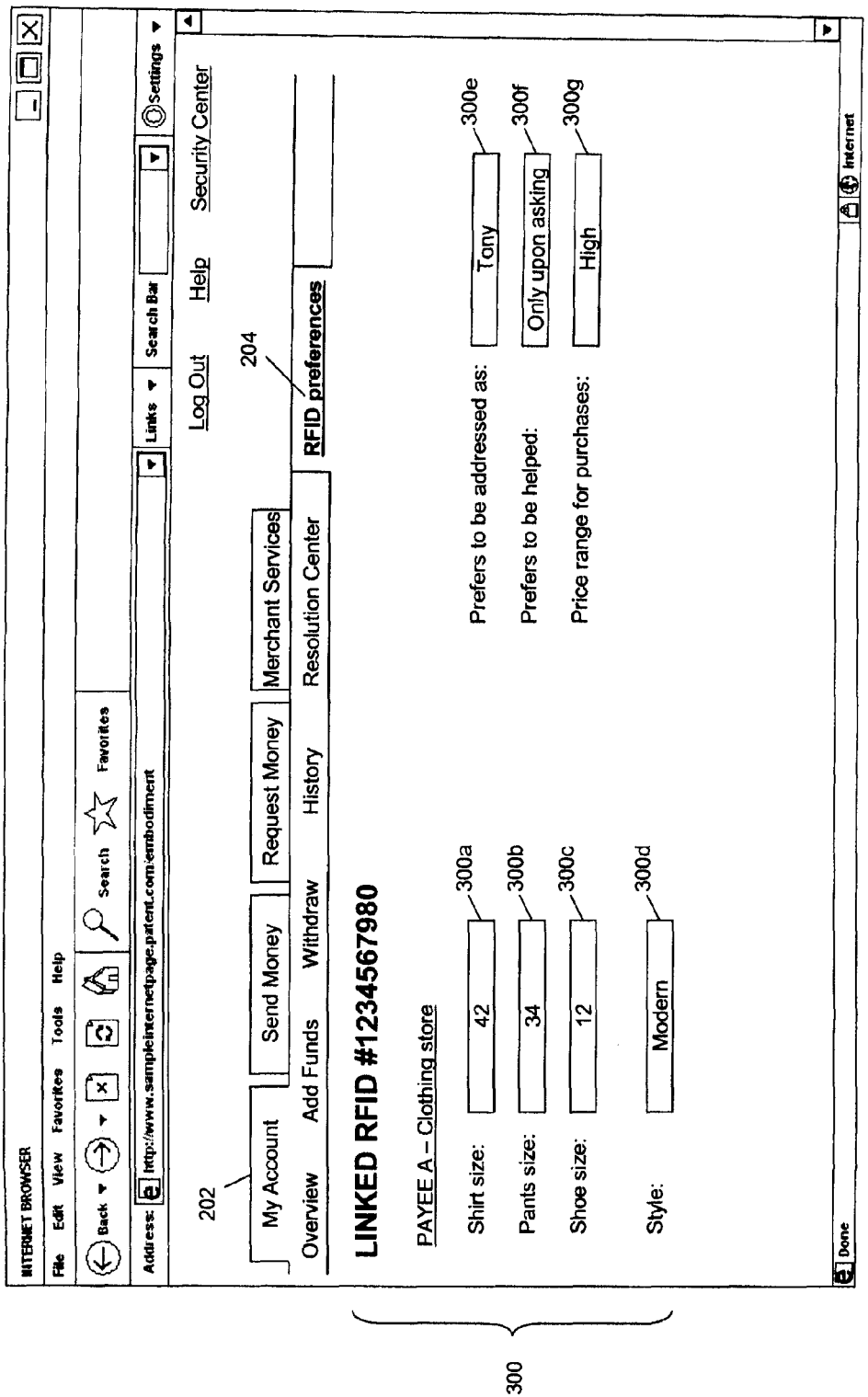
FIG. 3b is a screenshot view illustrating an embodiment of a payer account website for providing a plurality of payer information.
Figure 3C:
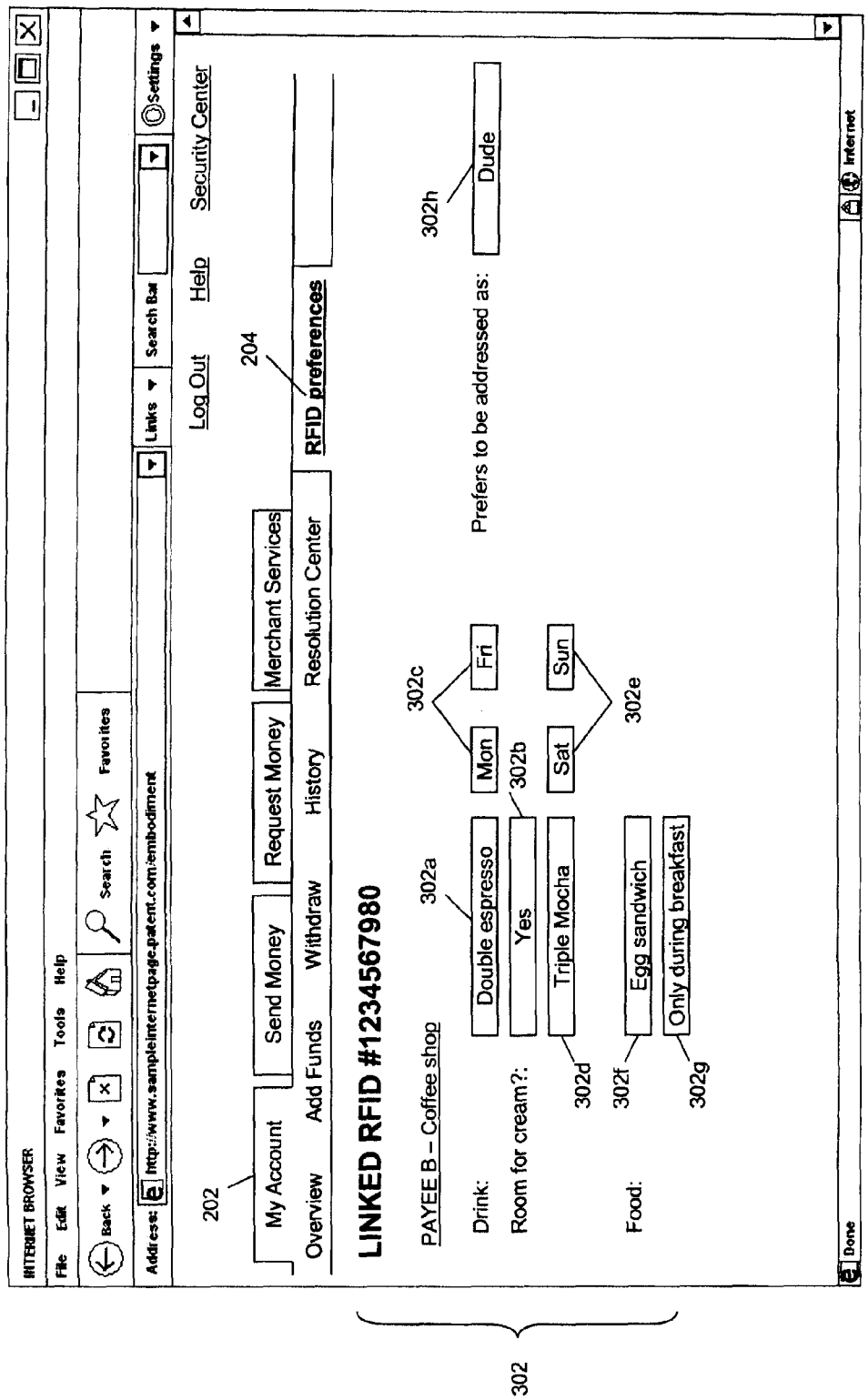
FIG. 3c is a screenshot view illustrating an embodiment of a payer account website for providing a plurality of payer information.

Referring now to FIGS. 3a, 3b, and 3c, a method for providing payer information to a payee is illustrated. As discussed above, the payer may be provided with one or more RFID devices from payees, account providers, and/or payment service providers, and each RFID device includes an RFID tag that has been programmed with an RFID identifier such as, for example, an account number, that the RFID tag is operable to transmit to a payer device.

The method 300 begins at block 302 where an RFID identifier is associated with a payer account in a database. In an embodiment, block 302 of the method 300 may be carried out substantially similarly as block 202 of the method 200, described above with reference to FIGS. 2a and 2b. The method 300 then proceeds to blocks 304 and 306 where a plurality of payer information is received and associated with an RFID identifier in the database. In an embodiment, the method 300 may involve payees registering with the payment service provider and specifying different types of information they would like payers to provide to them. Referring now to FIGS. 2b and 3b, in an embodiment, in response to the payer selecting the modify information preferences links 208a in one of the linked RFID sections 208 on the payer account webpage 200, the payer may be presented with a linked RFID payer information section 300 that, in the illustrated embodiment, has been customized for a payee that sells clothing. The linked RFID payer information section 300 includes a first clothing size input 300a, a second clothing size input 300b, a third clothing size input 300c, a clothing style input 300d, a name preference input 300e, a service preference input 300f, and a price range input 300g. As discussed above, the payee that sells clothing may have registered with the payment service provider and requested that the payer be provided with the first clothing size input 300a, the second clothing size input 300b, the third clothing size input 300c, the clothing style input 300d, the name preference input 300e, the service preference input 300f, and the price range input 300g. Thus, the payer may provide information such as a shirt size (in the first clothing size input 300a,) a pants size (in the second clothing size input 300b,), a shoe size (in the third clothing size input 300c,) a clothing style that the payer prefers (in the clothing style input 300d,) a name that the payer prefers to be addressed as (in the name preference input 300e,) an indication of when or how often employees of the payee should approach the payer (in the service preference input 300f,) and an amount that the payer typically spends (in the price range input 300g.) The information provided by the payer may then be associated by the payment service provider with the linked RFID identifier in the database.

Furthermore, the inputs 300a, 300b, 300c, 300d, 300e, 300f, and 300g, rather than being input by the payer, may be populated by the payee and/or the payment service provider. In an embodiment, past transactions conducted using an account associated with the linked RFID identifier (and/or other accounts funding sources associated with the payer account) may be used to determine the appropriate information to provide in the inputs 300a, 300b, 300c, 300d, 300e, 300f, and 300g. For example, past transactions may indicate a payers clothing sizes, clothing style, price range, etc.

Referring now to FIG. 3c, in another embodiment, in response to the payer selecting the modify information preferences links 208a in one of the linked RFID sections 208 on the payer account webpage 200, the payer may be presented with a linked RFID payer information section 302 that, in the illustrated embodiment, is customized for a payee that sells coffee and food. The linked RFID payer information section 302 includes a first drink input 302a with an associated drink modifier input 302b and a drink time input 302c, a second drink input 302d with an associated drink time input 302e, a food input 302f with an associated food time input 302g, and a name preference input 302h. As discussed above, the payee that sells coffee and food may have registered with the payment service provider and requested that the payer be provided with the first drink input 302a with the associated drink modifier input 302b and the drink time input 302c, the second drink input 302d with the associated drink time input 302e, the food input 302f with the associated food time input 302g, and the name preference input 302h. Thus, the payer may provide information such as a preferred drink (in the first drink input 302a) with an instruction to leave room for a drink additive (in the associated drink modifier input 302b) and a time when that drink should be provided (in the drink time input 302c,) a preferred drink (in the second drink input 302d) with a time that drink should be provided (in the drink time input 302e,) a preferred food (in the food input 302f) with a time that food should be provided (in the associated food time input 302g,) and a name the payer prefers to be addressed as (in the name preference input 302h.) The information provided by the payer may then be associated by the payment service provider with the linked RFID identifier in the database.

Furthermore, the inputs 302a, 302b, 302c, 302d, 302e, 302f, 302g, and 302h, rather than being input by the payer, may be populated by the payee and/or the payment service provider. In an embodiment, past transactions conducted using an account associated with the linked RFID identifier (and/or other accounts funding sources associated with the payer account) may be used to determine the appropriate information to provide in the inputs 302a, 302b, 302c, 302d, 302e, 302f, 302g, and 302h. For example, past transactions may indicate a preferred drink, drink modifier, drink time, food, etc. While a plurality of examples payer information has been described as being associated with the linked RFID indicator, they are not meant to be limiting, and one of skill in the art will recognize that a variety of other payer information may be associated with the linked RFID identifier without departing from the scope of the present disclosure.

The method 300 then proceeds to block 308 where an RFID identifier is received from a payee. In an embodiment, the receiving of the RFID identifier in block 308 of the method 300 may be substantially similar to the receiving of the RFID identifier with the payment request described with reference to block 208 of the method 200, with the exception that the RFID identifier may be sent without a payment request. For example, the payer may provide an RFID device to a payee device upon entering or while located at an establishment of the payee to transmit the RFID identifier associated with that RFID device to a payee device. The payment service provider may then receive the RFID identifier and optionally payee information from the payee device over a network.

The method 300 then proceeds to block 310 where the payee is provided with payer information. In response to receiving the RFID identifier, the payment service provider may access a database and determine whether any payer information is associated with that RFID identifier. For example, the payer may posses a single RFID device that was previously provided to the payer by the payee, and upon receipt of the RFID identifier, the payment service provider device may access a database to determine if that RFID identifier includes associated payer information and, if so, provide that payer information to a payee device over the network. In another example, the payer may possess a plurality of linked RFID devices and a master RFID device, discussed above, and upon receiving the master RFID identifier, the payment service provider device may access a database and use payee information to determine if any of the linked RFID identifiers are associated with the payee information. If one of the linked RFID identifiers is associated with the payee information, the payment service provider device determines if payer information is associated with that linked RFID identifier and provides that payer information to the payee device.

Thus, a system and method are provided that allow a payer to use an RFID device to transmit payer information to a payee. A plurality of RFID identifiers may be associated with a single RFID identifier such that a payer need only carry one RFID device to be able to transmit a plurality of different payer information, each specific to a particular payee, to a plurality of different payees. The payee may use the payer information to help complete a transaction with the payer.

While the method 200 that allows a payer to use an RFID device to make a purchase while determining the funding source for that purchase automatically based on a purchase type and a purchase amount, and the method 300 for transmitting payer information to a payee have been presented separately above, one of skill in the art will recognize that these methods may be combined to provide functionality that will fall within the scope of the present disclosure. In an embodiment, a payer may provide for a particular payee a plurality of purchase types that include associated payer information and spending gate definitions. For example, using the techniques discussed above, a payer may instruct a payee to, upon being transmitted an RFID identifier associated with that payer, provide a double espresso coffee drink if the day of the week is Monday through Friday and a triple mocha coffee drink if the day of the week is Saturday or Sunday. Furthermore, with the same RFID identifier, the payer may instruct the payment service provider to use a checking account to pay for the purchase if the purchase includes just a coffee drink, to use a credit account if the purchase includes food, and to use a savings account if the purchase is over $75.

Furthermore, the payment service provider may use payment histories of a payer to automatically associate preferences and/or spending gates with a payer account. For example, the payment service provider may determine, using payment histories of the payer, that payments of certain amounts are made using particular accounts, payments to certain payees are made using particular accounts, payments for certain purchases are made using particular accounts, etc., and the payment service provider may then associate those accounts with those types of payments automatically. Thus, a plurality of spending gates and/or preferences may be automatically created for a payer accounts as described above. In an embodiment, automatically-created spending gates and/or preferences may be created as a default for a payer account and may, for example, be associated with RFID tags that have not had spending gates and/or preferences associated with them.

In another embodiment, preferences may be associated with different accounts. For example, the payer may associate preferences (e.g., food or drink preferences, clothing preferences, etc.,) with a particular credit card, and the use of that credit card with a payee may provide those preferences to the payee. Thus, a payer may provide credit card information to a payer (e.g., by 'swiping' the credit card,) and that credit card information may provide the purchase details the payer wishes to make (e.g., a food order) as well as payment information for that purchase.

Figure 4:
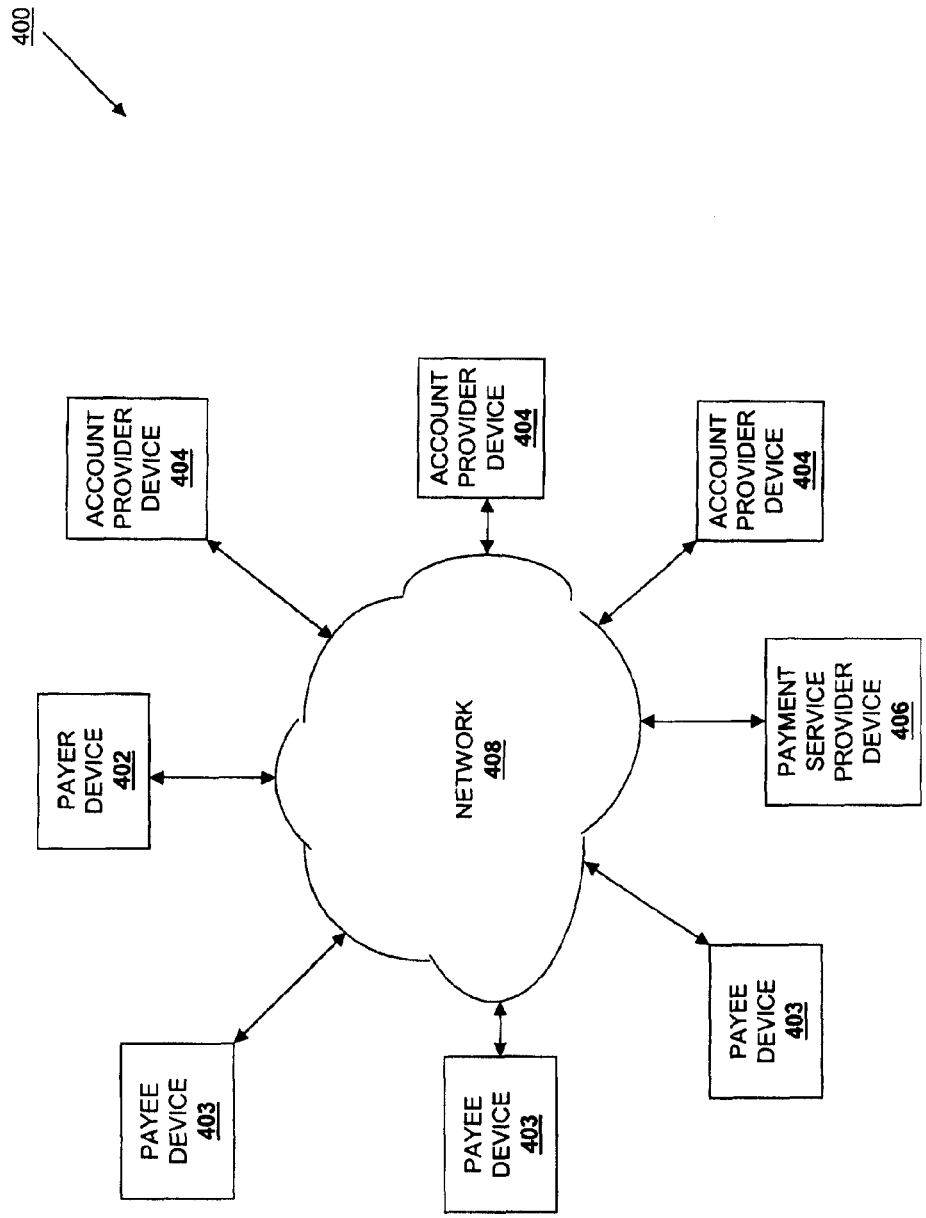
FIG. 4 is a schematic view illustrating an embodiment of a networked system.

Referring now to FIG. 4, an embodiment of a networked system 400 used in the payment system is illustrated. The networked system 400 includes a payer device 402, a plurality of payee devices 403, a plurality of account provider devices 404, and a payment service provider device 406 in communication over a network 408. The payer device 402 may be any device used to access the payer account websites 104 and 200 and/or provide the payment service provider device 406 with information about RFID identifiers, purchase types, and spending gate definitions, discussed above. The payee devices 403 may be any device used to receive RFID identifier transmissions and send those transmissions to the payment service provider device 406. The account provider devices 404 may be any device used to receive a payment from the payment service provider device 406. The payment service provider device 406 may include devices to provide the payer account websites 104 and 200, discussed above, make a payment to a payee of the payer, or access an account provider to be reimbursed for a payment made, and may be a device operated by payment service provider such as, for example, PayPal Inc. of San Jose, Calif.

The payer device 402, payee devices 403, account provider devices 404, and payment service provider device 406 (discussed in further detail below) may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 400, and/or accessible over the network 408.

The network 408 may be implemented as a single network or a combination of multiple networks. For example, in various embodiments, the network 408 may include the Internet and/or one or more intranets, landline networks, wireless networks, and/or other appropriate types of networks.

The payer device 402 may be implemented using any appropriate combination of hardware and/or software configured for wired and/or wireless communication over network 408. For example, in one embodiment, the payer device 402 may be implemented as a personal computer of a payer in communication with the Internet. In other embodiments, the payer device 402 may be a smart phone, personal digital assistant (PDA), laptop computer, and/or other types of computing devices.

The payer device 402 may include one or more browser applications which may be used, for example, to provide a convenient interface to permit the payer to browse information available over the network 408. For example, in one embodiment, the browser application may be implemented as a web browser configured to view information available over the Internet.

The payer device 402 may also include one or more toolbar applications which may be used, for example, to provide payer-side processing for performing desired tasks in response to operations selected by the payer. In one embodiment, the toolbar application may display a user interface in connection with the browser application.

The payer device 402 may further include other applications as may be desired in particular embodiments to provide desired features to the payer device 402. In particular, the other applications may include a payment application for payments through the payment service provider device 406. The other applications may also include security applications for implementing user-side security features, programmatic user applications for interfacing with appropriate application programming interfaces (APIs) over the network 408, or other types of applications. Email and/or text applications may also be included, which allow the payer to send and receive emails and/or text messages through the network 408. The payer device 402 includes one or more user and/or device identifiers which may be implemented, for example, as operating system registry entries, cookies associated with the browser application, identifiers associated with hardware of the payer device 402, or other appropriate identifiers, such as a phone number. In one embodiment, the user identifier may be used by the payment service provider device 406 to associate the payer with a particular account maintained by the payment service provider device 406 as further described herein.

The account provider device 404 may be maintained, for example, by an account provider that provides one or more of the funding sources for the payer account, discussed above. In this regard, the account provider device 404 may include a database identifying funding sources and respective funding source information for the payer account.

Figure 5:
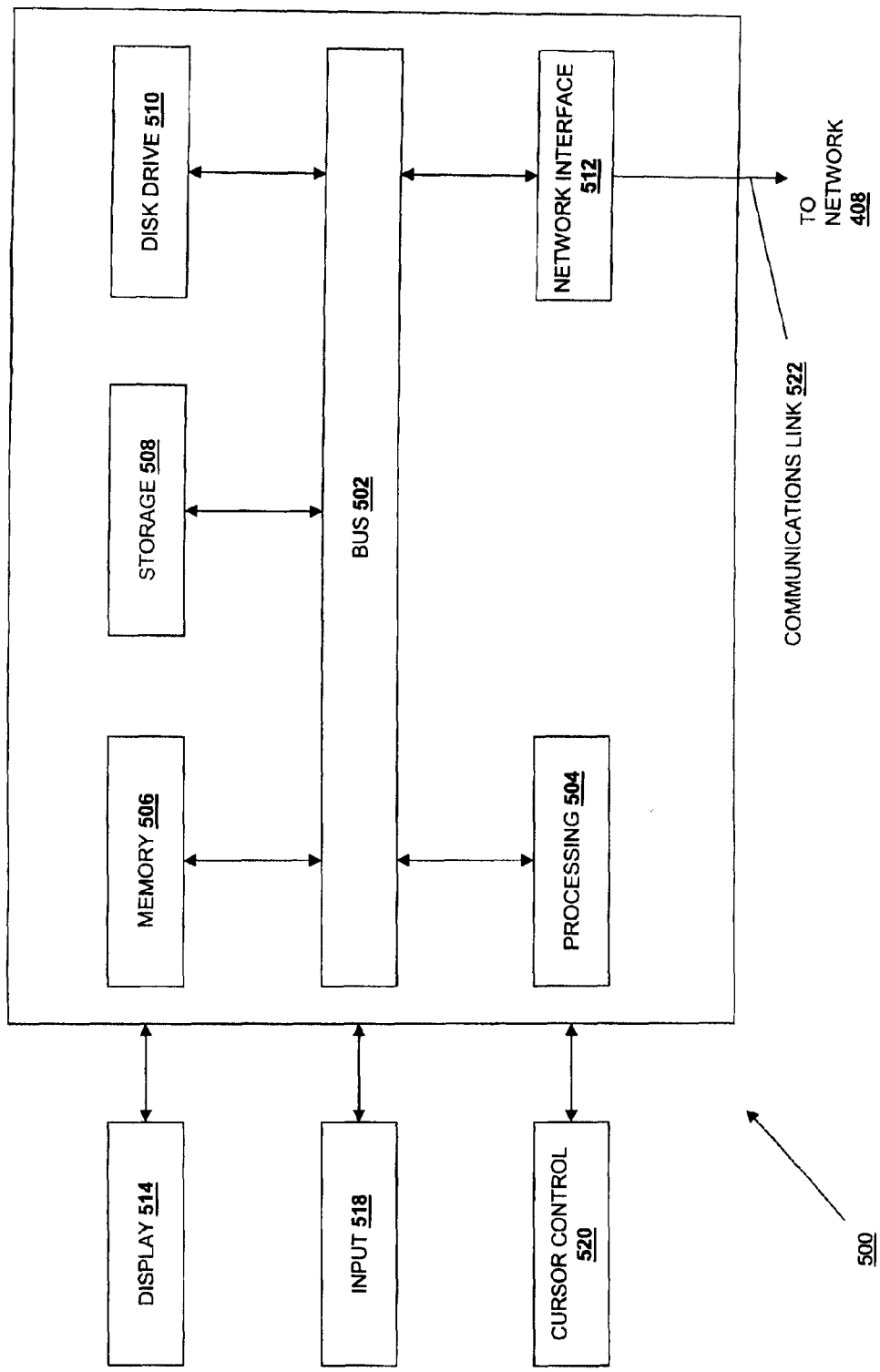
FIG. 5 is a schematic view illustrating an embodiment of a computer system.

Referring now to FIGS. 4 and 5, an embodiment of a computer system 500 suitable for implementing, for example, the payer device 402, the payee devices 403, the account provider devices 404, and/or the payment service provider device 406, is illustrated. In various implementations, the device(s) may comprise a computing device (e.g., a computer, laptop, smart phone, PDA, etc.) capable of communicating with the network 408. It should be appreciated that other devices utilized by payers, account providers, and payment service providers in the payment system may be implemented as the computer system 500 in a manner as follows.

In accordance with various embodiments of the present disclosure, computer system 500, such as a computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), and/or a cursor control component 520 (e.g., mouse, pointer, or trackball). In one implementation, the disk drive component 510 may comprise a database having one or more disk drive components.

In accordance with embodiments of the present disclosure, the computer system 500 performs specific operations by the processor 504 executing one or more sequences of instructions contained in system the memory component 506, such as described herein with respect to payer device 402, the payee devices 403, the account provider devices 404, and/or the payment service provider device 406. Such instructions may be read into the system memory component 506 from another computer readable medium, such as the static storage component 508 or the disk drive component 510. In other embodiments, hard-wired circuitry may be used in place of or in combination with software instructions to implement the present disclosure.

Logic may be encoded in a computer readable medium, which may refer to any medium that participates in providing instructions to the processor 504 for execution. Such a medium may take many forms, including but not limited to, non-volatile media, volatile media, and transmission media. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by the computer system 500. In various other embodiments of the present disclosure, a plurality of the computer systems 500 coupled by a communication link 522 to the network 408 (e.g., such as a LAN, WLAN, PTSN, and/or various other wired or wireless networks, including telecommunications, mobile, and cellular phone networks) may perform instruction sequences to practice the present disclosure in coordination with one another.

The computer system 500 may transmit and receive messages, data, information and instructions, including one or more programs (i.e., application code) through the communication link 522 and the network interface component 512. The network interface component 512 may include an antenna, either separate or integrated, to enable transmission and reception via the communication link 522. Received program code may be executed by processor 504 as received and/or stored in disk drive component 510 or some other non-volatile storage component for execution.

Figure 6:
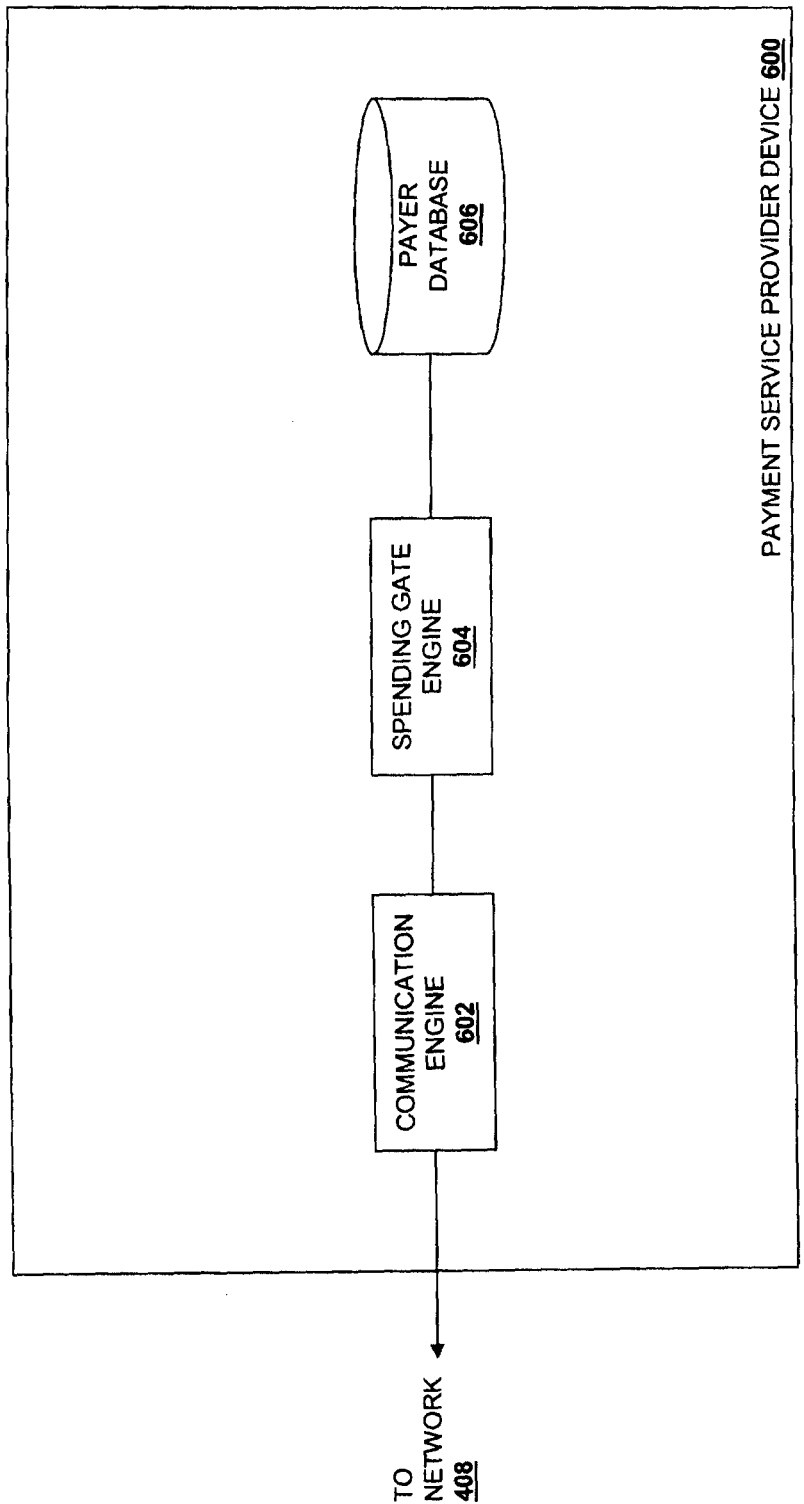
FIG. 6 is a schematic view illustrating an embodiment of a payment service provider device.

Referring now to FIGS. 4 and 6, an embodiment the payment service provider device 600, which may be the payment service provider device 406, is illustrated. The payment service provider device 600 includes a communication engine 602 that is coupled to the network 408 and a spending gate engine 604. The spending gate engine 604 is coupled to a payer database 606. The communication engine 602 may be software or instructions stored on a computer-readable medium that allows the payment service provider to send and receive information over the network 408. The spending gate engine 604 may be software or instructions stored on a computer-readable medium that is operable to send and receive information to and from the communication engine 602 (e.g., payment requests, funding source information, etc.) and access the payer database 606 to retrieve RFID identifiers, purchase types, spending gate definitions, etc., as discussed above.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and seller; however, a user or consumer can pay virtually, or otherwise interact with any type of recipient, including charities and individuals. The payment does not have to involve a purchase, but can be a loan, a charitable contribution, a gift, etc. Thus, payee as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for making a payment using a Radio Frequency Identification (RFID) system, comprising:
    associating, by a payment service provider device, a first RFID identifier of a first physical RFID device with a payer account in a database;
    associating, by the payment service provider device, a second RFID identifier of a second physical RFID device with the first RFID identifier in the payer account in the database;
    receiving, by the payment service provider device, a purchase type and an associated spending gate definition for the first RFID identifier over a network, wherein the spending gate definition is associated with at least one of a plurality of funding sources of the payer account;
    associating, by the payment service provider device, the purchase type and associated spending gate definition with the first RFID identifier in the database;
    receiving, by the payment service provider device, a payment request for a purchase using the second RFID identifier over the network;
    determining, by the payment service provider device, that the second RFID identifier is associated with the first RFID identifier and, in response, determining that payment request includes the purchase type for the first RFID identifier; and
    processing, by the payment service provider device, a payment using the at least one funding source of the payer account according to the spending gate definition associated with the purchase type.

2. The method of claim 1, wherein the purchase type includes a type of goods being purchased.

3. The method of claim 1, wherein the first RFID identifier is associated with a first payee.

4. The method of claim 3, further comprising:
    receiving, by the payment service provider device, a plurality of payer information for the first RFID identifier over the network, wherein the plurality of payer information is not related to the payer account;
    associating, by the payment service provider device, the plurality of payer information with the first RFID identifier in the database;
    receiving, by the payment service provider device, the first RFID identifier over the network;
    sending, by the payment service provider device, the plurality of payer information over the network to a payee device that is associated with the first payee.

5. The method of claim 1, wherein the second RFID identifier is associated with a second payee in the database, and wherein the method further comprises:
    receiving, by the payment service provider device, a plurality of payer information for the second RFID identifier over the network, wherein the plurality of payer information is not related to the payer account;
    associating, by the payment service provider device, the plurality of payer information with the second RFID identifier in the database;
    receiving, by the payment service provider device, the first RFID identifier from the second payee over the network;
    determining, by the payment service provider device, that the second RFID identifier is associated with the first RFID identifier and the second payee in the database; and
    sending, by the payment service provider device, the plurality of payer information over the network to a payee device that is associated with the second payee.

6. The method of claim 1, wherein the first RFID identifier is associated with a first payee and the second RFID identifier is associated with a second payee in the database, and wherein the second payee is a different payee than the first payee.

7. A non-transitory, machine-readable medium comprising a plurality of machine-readable instructions that, when executed by one or more processors, are adapted to cause the one or more processors to perform a method comprising:
    associating a first RFID identifier of a first physical RFID device with a payer account in a database;
    associating a second RFID identifier of a second physical RFID device with the first RFID identifier in the payer account in the database;
    receiving a purchase type and an associated spending gate definition for the first RFID identifier over a network, wherein the spending gate definition is associated with at least one of a plurality of funding sources of the payer account;
    associating the purchase type and associated spending gate definition with the first RFID identifier in the database;
    receiving a payment request for a purchase using the second RFID identifier over the network;
    determining that the second RFID identifier is associated with the first RFID identifier and, in response, determining that the payment request includes the purchase type for the first RFID identifier; and
    processing a payment using the at least one funding source of the payer account according to the spending gate definition associated with the purchase type.

8. The machine-readable medium of claim 7, wherein the purchase type includes a type of goods being purchased.

9. The machine-readable medium of claim 7, wherein the first RFID identifier is associated with a first payee.

10. The non-transitory machine-readable medium of claim 9, wherein the plurality of machine-readable instructions are adapted to cause the one or more processors to perform the method further comprising:
    receiving a plurality of payer information for the first RFID identifier over the network, wherein the plurality of payer information is not related to the payer account;
    associating the plurality of payer information with the first RFID identifier in the database;
    receiving the first RFID identifier over the network;
    sending the plurality of payer information over the network to a payee device that is associated with the first payee.

11. The machine-readable medium of claim 9, wherein the second RFID identifier is associated with a second payee in the database, and wherein the plurality of machine-readable instructions are adapted to cause the one or more processors to perform the method further comprising:
    receiving a plurality of payer information for the second RFID identifier over the network, wherein the plurality of payer information is not related to the payer account;
    associating the plurality of payer information with the second RFID identifier in the database;
    receiving the first RFID identifier from the second payee over the network;
    determining that the second RFID identifier is associated with the first RFID identifier and the payee in the database; and
    sending the plurality of payer information over the network to a payee device that is associated with the second payee.

12. The machine-readable medium of claim 9, wherein the first RFID identifier is associated with a first payee and the second RFID identifier is associated with a second payee in the database, and wherein the second payee is a different payee than the first payee.

13. A Radio Frequency Identification (RFID) payment system, comprising:
- at least one non-transitory, computer readable medium storing a payer account;
- at least one processing system that is coupled to the at least one non-transitory, computer readable medium and that is configured to execute instructions that are stored on the at least one non-transitory, computer readable medium to perform the steps of:
  - associating a first RFID identifier of a first physical RFID with the payer account in the at least one non-transitory, computer readable medium;
  - associating a second RFID identifier of a second physical RFID with the first RFID identifier in the payer account in the at least one non-transitory, computer readable medium;
  - receiving a purchase type and an associated spending gate definition for the first RFID identifier, wherein the spending gate definition is associated with at least one of a plurality of funding sources of the payer account;
  - associating the purchase type and associated spending gate definition with the first RFID identifier in the at least one non-transitory, computer readable medium;
  - receiving a payment request for a purchase using the first RFID identifier;
  - determining that the second RFID identifier is associated with the first RFID identifier in the at least one non-transitory, computer readable medium and, in response, determining that the payment request includes the purchase type for the first RFID identifier; and
  - making a payment using the at least one funding source of the payer account according to the spending gate definition associated with the purchase type.

14. The system of claim 13, wherein the first RFID identifier is associated with a first payee in the at least one non-transitory, computer readable medium and the at least one processing system is configured to execute instructions that are stored on the at least one non-transitory, computer readable medium to perform the steps of:
- receiving a plurality of payer information for the first RFID identifier, wherein the plurality of payer information is not related to the payer account;
- associating the plurality of payer information with the first RFID identifier in the at least one non-transitory, computer readable medium;
- receiving the first RFID identifier; and
- sending the plurality of payer information to the first payee.

15. The system of claim 13, wherein the second RFID identifier is associated with a second payee in the at least one non-transitory, computer readable medium, and wherein the at least one processing system is configured to execute instructions that are stored on the at least one non-transitory, computer readable medium to perform the steps of:
- receiving a plurality of payer information for the second RFID identifier, wherein the plurality of payer information is not related to the payer account;
- associating the plurality of payer information with the second RFID identifier in the at least one non-transitory, computer readable medium;
- receiving the first RFID identifier from the second payee;
- determining that the second RFID identifier is associated with the first RFID identifier and the second payee in the at least one non-transitory, computer readable medium; and
- sending the plurality of payer information to a payee device that is associated with the second payee.

16. The system of claim 13, wherein the first RFID identifier is associated with a first payee and the second RFID identifier is associated with a second payee in the at least one non-transitory, computer readable medium, and wherein the second payee is a different payee than the first payee.

* * * * *